(12) United States Patent
Shipman et al.

(10) Patent No.: US 9,676,444 B2
(45) Date of Patent: Jun. 13, 2017

(54) ELECTROMECHANICAL REAR DERAILLEUR

(71) Applicant: SRAM, LLC, Chicago, IL (US)

(72) Inventors: Christopher Shipman, Chicago, IL (US); Brian Jordan, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 185 days.

(21) Appl. No.: 14/061,138

(22) Filed: Oct. 23, 2013

(65) Prior Publication Data

US 2015/0111675 A1    Apr. 23, 2015

(51) Int. Cl.
| | | |
|---|---|---|
| *F16H 57/04* | (2010.01) | |
| *B62M 9/122* | (2010.01) | |
| *B62M 25/08* | (2006.01) | |
| *B62M 9/1248* | (2010.01) | |

(52) U.S. Cl.
CPC ............ *B62M 9/122* (2013.01); *B62M 25/08* (2013.01); *B62M 9/1248* (2013.01)

(58) Field of Classification Search
CPC ...... B62M 25/08; B62M 9/122; B62M 9/132; B62M 9/1242; B62M 9/1244
USPC ...................................................... 474/80, 82
See application file for complete search history.

(56) References Cited

U.S. PATENT DOCUMENTS

| | | | | |
|---|---|---|---|---|
| 3,181,383 A | * | 5/1965 | Juy ................................. 474/82 |
| 3,259,398 A | * | 7/1966 | Hattan .......................... 280/236 |
| 3,863,512 A | * | 2/1975 | Crawley ......................... 474/80 |
| 3,919,891 A | * | 11/1975 | Stuhlmuller et al. ........... 474/70 |
| 3,927,904 A | * | 12/1975 | Bergles .......................... 280/236 |
| 4,061,048 A | * | 12/1977 | Huret et al. .................... 474/82 |
| 4,143,557 A | * | 3/1979 | Wakebe et al. ................. 474/80 |
| 4,183,255 A | * | 1/1980 | Leiter ............................. 474/82 |
| 4,226,132 A | * | 10/1980 | Nagano et al. ................. 474/82 |
| 4,269,601 A | * | 5/1981 | Nagano .......................... 474/82 |
| 4,306,871 A | * | 12/1981 | Nagano .......................... 474/82 |
| 4,362,523 A | * | 12/1982 | Huret ............................. 474/82 |
| 4,384,864 A | * | 5/1983 | Bonnard ......................... 474/82 |
| 4,530,678 A | * | 7/1985 | Wechsler ........................ 474/81 |
| RE32,059 E | * | 12/1985 | Nagano .......................... 474/82 |
| 4,626,229 A | * | 12/1986 | Nagano .......................... 474/80 |
| 4,637,809 A | * | 1/1987 | Nagano .......................... 474/80 |
| 4,699,605 A | * | 10/1987 | Jona ............................... 474/82 |
| 4,731,045 A | * | 3/1988 | Nagano .......................... 474/78 |

(Continued)

FOREIGN PATENT DOCUMENTS

| | | |
|---|---|---|
| DE | 4022473 A1 † | 1/1992 |
| EP | 841243 | 5/1998 |
| EP | 1752373 | 11/2008 |

*Primary Examiner* — Henry Liu
(74) *Attorney, Agent, or Firm* — Milan Milosevic; Lisa Serdynski

(57) ABSTRACT

An electromechanical rear derailleur is provided for a bicycle, including a base member for attachment to the bicycle along a mounting axis. A movable member has a cage assembly attached thereto. A linkage is provided including pivot axes oriented substantially perpendicular to the mounting axis, the linkage coupling the movable member to the base member and operative to enable movement of the movable member relative to the base member in a direction substantially parallel to the mounting axis. A power source powers an electric motor connected thereto and a transmission is coupled to and actuated by the motor to move the movable member.

25 Claims, 23 Drawing Sheets

(56) References Cited

U.S. PATENT DOCUMENTS

| | | | |
|---|---|---|---|
| 4,801,287 A * | 1/1989 | Romano | 474/82 |
| 4,894,046 A * | 1/1990 | Browning | 474/78 |
| 4,946,425 A * | 8/1990 | Buhlmann | 474/80 |
| 4,952,196 A * | 8/1990 | Chilcote et al. | 474/70 |
| 5,328,414 A * | 7/1994 | Ancarani Restelli | 474/80 |
| 5,397,273 A * | 3/1995 | Ando | 474/82 |
| 5,470,277 A | 11/1995 | Romano | |
| 5,480,356 A * | 1/1996 | Campagnolo | 474/70 |
| 5,494,307 A * | 2/1996 | Anderson | 280/236 |
| 5,653,649 A | 8/1997 | Watarai | |
| 6,023,646 A | 2/2000 | Kubacsi et al. | |
| 6,162,140 A * | 12/2000 | Fukuda | 474/70 |
| 6,204,775 B1 | 3/2001 | Kubacsi | |
| 6,623,389 B1 * | 9/2003 | Campagnolo | 474/70 |
| 6,659,895 B2 * | 12/2003 | Fukuda | 474/70 |
| 6,676,549 B1 * | 1/2004 | Fukuda | 474/102 |
| 6,679,797 B2 * | 1/2004 | Valle | 474/80 |
| 6,682,087 B1 | 1/2004 | Takeda | |
| 6,726,586 B2 * | 4/2004 | Fukuda | 474/70 |
| 6,740,003 B2 * | 5/2004 | Fukuda | 477/78 |
| 6,761,655 B2 * | 7/2004 | Fukuda | 474/70 |
| 6,781,510 B2 | 8/2004 | Takeda | |
| 6,843,741 B2 * | 1/2005 | Fujii | 474/70 |
| 6,857,975 B2 * | 2/2005 | Kitamura | 474/70 |
| 6,896,277 B2 | 5/2005 | Meggiolan | |
| 6,917,283 B2 | 7/2005 | Takeda | |
| 6,923,355 B2 | 8/2005 | Campagnolo | |
| 6,945,888 B2 * | 9/2005 | Fukuda et al. | 474/70 |
| 6,979,009 B2 * | 12/2005 | Ichida et al. | 280/238 |
| 6,997,835 B2 † | 2/2006 | Fukuda | |
| 7,001,294 B2 * | 2/2006 | Fukuda | 474/102 |
| 7,004,862 B2 * | 2/2006 | Fukuda | 474/102 |
| 7,086,974 B2 | 8/2006 | Dal Pra | |
| 7,100,932 B2 | 9/2006 | Meggiolan | |
| 7,144,027 B2 * | 12/2006 | Kitamura et al. | 280/260 |
| 7,243,937 B2 | 7/2007 | Ishikawa | |
| 7,255,660 B2 * | 8/2007 | Del Pra | 474/82 |
| 7,264,256 B2 * | 9/2007 | Fujii | 280/261 |
| 7,267,352 B2 | 9/2007 | Ishikawa | |
| 7,290,458 B2 | 11/2007 | Fukuda | |
| 7,291,079 B2 * | 11/2007 | Ichida et al. | 474/80 |
| 7,320,655 B2 * | 1/2008 | Fukuda | 474/80 |
| 7,341,532 B2 * | 3/2008 | Ichida et al. | 474/70 |
| 7,381,142 B2 * | 6/2008 | Campagnolo | 474/70 |
| 7,411,307 B2 | 8/2008 | Uno | |
| 7,442,136 B2 * | 10/2008 | Ichida et al. | 474/82 |
| 7,467,567 B2 * | 12/2008 | Fukuda | 74/412 R |
| 7,503,863 B2 * | 3/2009 | Ichida et al. | 474/80 |
| 7,585,237 B2 * | 9/2009 | Fukuda | 474/80 |
| 7,623,931 B2 | 11/2009 | Campagnolo | |
| 7,704,173 B2 * | 4/2010 | Ichida et al. | 474/82 |
| RE41,782 E * | 9/2010 | Fukuda | 474/82 |
| 7,892,122 B2 * | 2/2011 | Fukuda | 474/82 |
| 7,942,768 B2 * | 5/2011 | Takamoto et al. | 474/82 |
| 7,980,974 B2 * | 7/2011 | Fukuda | 474/70 |
| 8,002,655 B2 * | 8/2011 | Meggiolan | 474/82 |
| 8,025,597 B2 * | 9/2011 | Takamoto | 474/70 |
| 8,162,191 B2 | 4/2012 | Tetsuka et al. | |
| 8,202,182 B2 * | 6/2012 | Ishikawa et al. | 474/82 |
| 8,220,679 B2 | 7/2012 | Yoshida et al. | |
| 8,241,158 B2 * | 8/2012 | Ishikawa | 474/80 |
| 8,882,618 B2 * | 11/2014 | Yamaguchi et al. | 474/82 |
| 8,888,620 B2 * | 11/2014 | Emura et al. | 474/80 |
| 8,974,331 B2 * | 3/2015 | Yamaguchi | 474/82 |
| 9,005,059 B2 * | 4/2015 | Suyama et al. | 474/82 |
| 2003/0038625 A1 † | 2/2003 | Guderzo | |
| 2003/0092519 A1 * | 5/2003 | Fukuda | 474/70 |
| 2004/0102268 A1 * | 5/2004 | Valle | 474/80 |
| 2004/0114407 A1 | 6/2004 | Kitamura et al. | |
| 2004/0116221 A1 * | 6/2004 | Fukuda | 474/82 |
| 2004/0138017 A1 * | 7/2004 | Kitamura | 474/82 |
| 2005/0156001 A1 | 7/2005 | Dal Pra et al. | |
| 2005/0187048 A1 * | 8/2005 | Fukuda | 474/70 |
| 2005/0187050 A1 * | 8/2005 | Fukuda | 474/80 |
| 2005/0192137 A1 * | 9/2005 | Ichida et al. | 474/70 |
| 2005/0192139 A1 * | 9/2005 | Ichida et al. | 474/80 |
| 2005/0192140 A1 * | 9/2005 | Meggiolan | 474/80 |
| 2005/0199083 A1 | 9/2005 | Meggiolan | |
| 2005/0205323 A1 * | 9/2005 | Ichida et al. | 180/205 |
| 2005/0215369 A1 * | 9/2005 | Fukuda et al. | 474/82 |
| 2005/0239587 A1 * | 10/2005 | Ichida et al. | 474/82 |
| 2006/0100045 A1 * | 5/2006 | Fukuda | 474/70 |
| 2006/0183584 A1 * | 8/2006 | Fukuda | 474/70 |
| 2006/0189422 A1 * | 8/2006 | Ichida et al. | 474/80 |
| 2006/0211528 A1 * | 9/2006 | Campagnolo | 474/70 |
| 2007/0037645 A1 * | 2/2007 | Ishikawa | 474/80 |
| 2007/0184925 A1 * | 8/2007 | Ichida | B62M 25/08 474/80 |
| 2007/0191159 A1 * | 8/2007 | Fukuda | 474/82 |
| 2007/0219029 A1 * | 9/2007 | Turner | 474/80 |
| 2008/0132364 A1 * | 6/2008 | Ichida et al. | 474/70 |
| 2008/0238367 A1 | 10/2008 | Guderzo | |
| 2009/0098963 A1 * | 4/2009 | Watarai et al. | 474/80 |
| 2009/0191994 A1 * | 7/2009 | Takamoto et al. | 474/70 |
| 2009/0209375 A1 * | 8/2009 | Takamoto | 474/18 |
| 2009/0215561 A1 * | 8/2009 | Fukuda | 474/82 |
| 2009/0240858 A1 | 9/2009 | Takebayashi | |
| 2009/0291789 A1 * | 11/2009 | Ishikawa et al. | 474/82 |
| 2009/0315692 A1 | 12/2009 | Miki et al. | |
| 2012/0214628 A1 * | 8/2012 | Johnson et al. | 474/80 |
| 2012/0258827 A1 * | 10/2012 | Ishikawa et al. | 474/80 |
| 2012/0322591 A1 * | 12/2012 | Kitamura et al. | 474/80 |
| 2013/0137541 A1 * | 5/2013 | Johnson et al. | 474/80 |
| 2013/0288834 A1 * | 10/2013 | Yamaguchi | 474/80 |
| 2013/0303317 A1 * | 11/2013 | Yamaguchi | 474/80 |
| 2014/0128191 A1 † | 5/2014 | Böhm | |

\* cited by examiner
† cited by third party

ELECTROMECHANICAL REAR DERAILLEUR

BACKGROUND OF THE INVENTION

This invention relates to bicycles and bicycle derailleurs. In particular the invention relates to electromechanical rear derailleurs for bicycles.

SUMMARY OF THE INVENTION

The invention provides, in one aspect, an electromechanical rear derailleur for a bicycle, including a base member attachable to the bicycle along a mounting axis. A movable member includes a cage assembly attached thereto. A linkage includes pivot axes oriented substantially perpendicular to the mounting axis. The linkage coupling the movable member to the base member is operative to enable movement of the movable member relative to the base member in a direction substantially parallel to the mounting axis. A power source is provided with a motor electrically connected to the power source, and a transmission is coupled to and actuated by the motor to move the movable member.

Other aspects of the invention provide a rear derailleur wherein the power source is disposed on or in the base member. The linkage may include an outer link member and an inner link member. The linkage may include link pins on which the linkage pivots, the link pins defining the pivot axes. The transmission may include a plurality of gears rotatable about a plurality of gear axes, respectively, wherein the gear axes are substantially parallel to the pivot axes. The transmission may be disposed on or in the base member. The motor may be disposed on or in the base member. The power source may be disposed on or in the base member. The linkage may include an outer link member and an inner link member. The rear derailleur may further include a clutch between the movable member and the transmission, the clutch moving the movable member responsive to operation of the transmission. The clutch may include a drive arm coupled to the transmission and a clutch spring in contact with the drive arm. The transmission may include an output gear and the drive arm is coupled to the output gear. The clutch spring may be disposed on the inner link member. The clutch spring may be disposed about the link pin that attaches the inner link member to the movable member. The motor may have a motor shaft with a motor shaft axis that is perpendicular to the pivot axes. The linkage may include link pins on which the linkage pivots, the link pins defining the pivot axes, wherein the pivot axes are substantially parallel to the mounting axis and the transmission includes a plurality of gears rotatable about a plurality of gear axles, respectively, wherein at least some of the gear axles have gear axle axes that are substantially parallel to the pivot axes.

The invention also provides in an alternative embodiment an electromechanical rear derailleur for a bicycle, including a base member attachable to the bicycle. A movable member is provided having a cage assembly attached thereto. A linkage is provided coupling the movable member to the base member and operative to enable movement of the movable member relative to the base member. The derailleur includes a power source and a motor electrically connected to the power source. A transmission is coupled to and actuated by operation of the motor to move the movable member and a position detector is provided, including a magnet rotated by the transmission, a sensor to sense rotation of the magnet, a magnet guide sized and shaped to guidingly receive a portion of the magnet and position the magnet within an effective range of the sensor.

Alternatives include wherein the rear derailleur includes a magnet holder disposed in the rear derailleur, the magnet held by the magnet holder. The magnet holder may be coupled to the transmission. The rear derailleur may further include a PC board positioned in the base member and wherein the sensor is disposed on the PC board in position to sense motion of the magnet. A magnet guide may be disposed on the PC board and the magnet extends from the magnet holder. The magnet holder may be attached to a position detector gear. The position detector gear may be in contact with and actuated by an output gear of the transmission. The rear derailleur may further include a position detector gear biasing gear disposed in the derailleur and coupled to the position detector gear to reduce backlash thereof.

These and other features and advantages of the present invention will be more fully understood from the following description of one or more embodiments of the invention, taken together with the accompanying drawings.

BRIEF DESCRIPTION OF THE DRAWINGS

In the drawings:

FIG. 3 is a section view of two linkage pivot pins located at the "B" knuckle of the derailleur through section E-E of FIG. 2a.

FIG. 4 is a section view of the two linkage pivot pins located at the "P" knuckle through section F-F of FIG. 2a.

FIGS. 6a, b, c are mechanical and electrical connections between the power source and the derailleur, and also show the sequential procedure for removing the battery from the derailleur through section D-D of FIG. 2a.

DETAILED DESCRIPTION OF THE PREFERRED EMBODIMENTS

Embodiments of the invention will herein be described with reference to the drawings. It will be understood that the drawings and descriptions set out herein are provided for illustration only and do not limit the invention as defined by the claims appended hereto and any and all their equivalents. For example, the terms "first" and "second," "front" and "rear," or "left" and "right" are used for the sake of clarity and not as terms of limitation. Moreover, the terms refer to bicycle mechanisms conventionally mounted to a bicycle and with the bicycle oriented and used in a standard fashion unless otherwise indicated.

Figure 1:
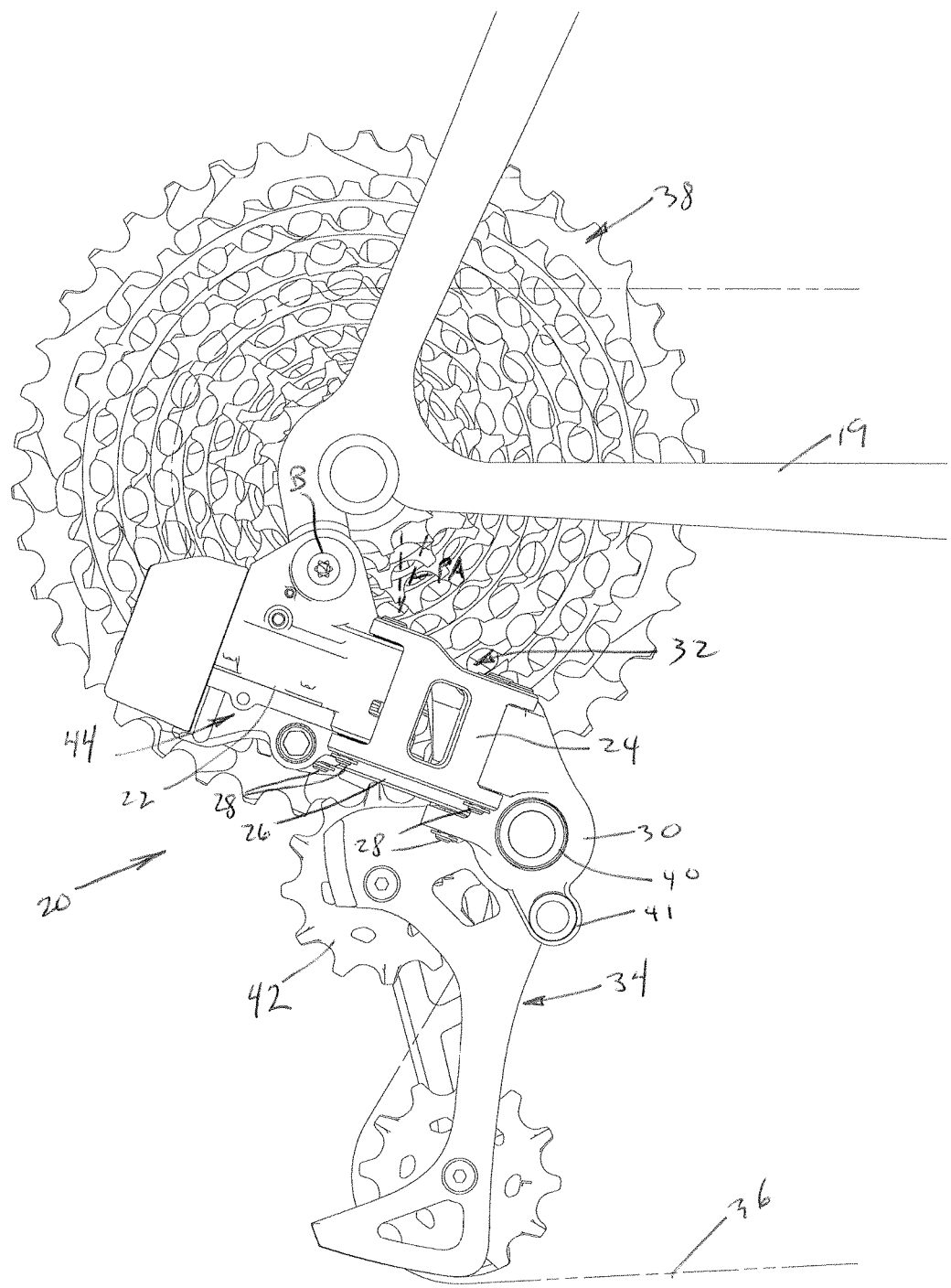
FIG. 1 is a rear derailleur according to the invention installed on a bicycle.
Figure 1A:
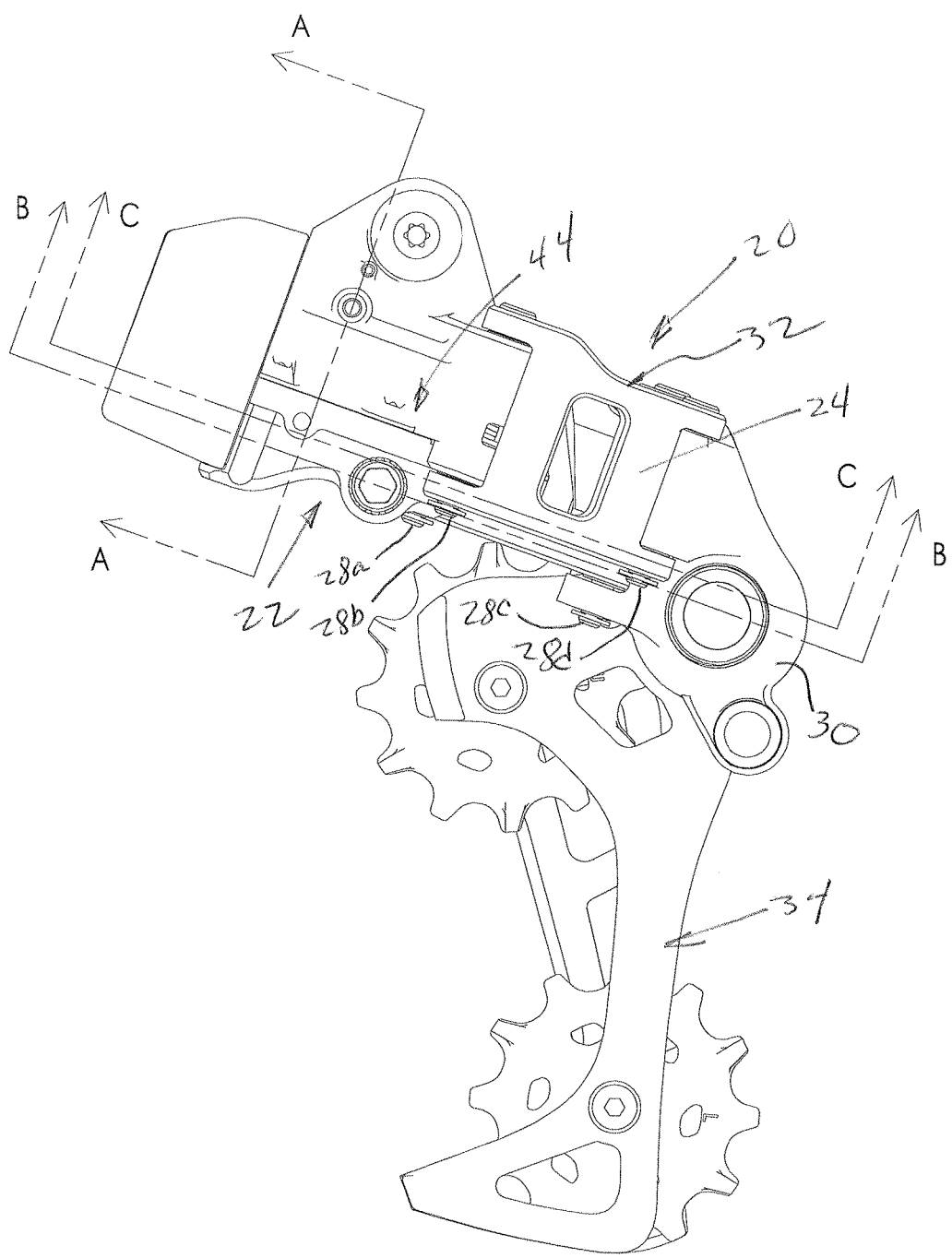
FIG. 1a is the rear derailleur shown partially-actuated.

FIGS. 1 and 1a are an overview of the derailleur assembly. The basic structure of the electromechanical rear derailleur or gear changer 20 includes a base member 22, also referred to as a "b-knuckle," which is attachable to a bicycle frame 19 in a conventional manner and an outer link 24 and an inner link 26, which is pivotally attached to the base member by link pins 28a-d, for example. A moveable member or assembly 30, also known as a "p-knuckle," is pivotally connected to the outer and inner links at an end opposite the base member to permit displacement of the moveable assembly relative to the base member 22.

The outer link 24 and inner link 26 taken together may be considered components of a linkage or link mechanism 32, for example a parallelogram-type link mechanism. Cage assembly 34 is pivotally connected to moveable assembly 30 in a conventional manner. A bicycle chain 36 may be engaged with a sprocket of a conventional sprocket assembly 38 and positioned in the cage assembly 34 in a conventional manner and can be shifted from one sprocket to another of the sprocket assembly by the movement of moveable assembly 30 and cage assembly relative to base member 22 in a lateral direction when mounted.

The derailleur 20 is of the "Straight-P" or straight parallelogram type in contrast to a "slant parallelogram" type derailleur. Straight-P derailleurs, or in other words non-slanted parallelogram derailleurs, have a linkage 32 with the pivot axes "PA" of the pins 28 (see FIG. 5b) forming the joints of the linkage substantially perpendicular (i.e., within a few degrees) to the axial A' direction, e.g., the mounting axis (see FIG. 2b). The mounting axis may be defined by the axis of a mounting bolt "B" of the derailleur or the axis of the hanger opening of the bicycle frame dropout, for example, (not shown). The pivot axes may also be considered parallel to the planes defined by the sprockets 38 (FIG. 1). This causes the moveable assembly 30 to move substantially horizontally. Also, the pivot axes PA may be vertical or non-vertical (see FIG. 1).

Because derailleur 20 is a straight-P, it has an offset jockey wheel 42, meaning that the rotational axis of the jockey wheel is not coincident with, i.e., is offset from, the axis of rotation of the cage about the p-knuckle 30, to accommodate the varying diameters of the sprockets 38. The derailleur may also be equipped with a damper assembly 40 and a cage lock 41 at the p-knuckle as is known in some mechanical derailleurs.

Figure 2A:
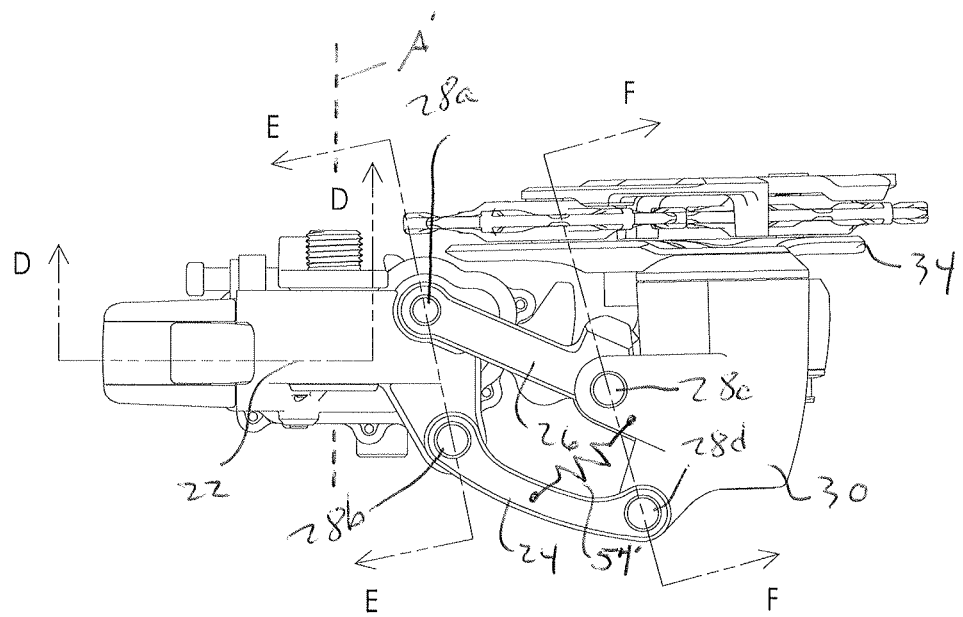
FIGS. 2a, b are two top views of a linkage of the derailleur at the outboard and inboard extremes of its travel, respectively.
Figure 2B:
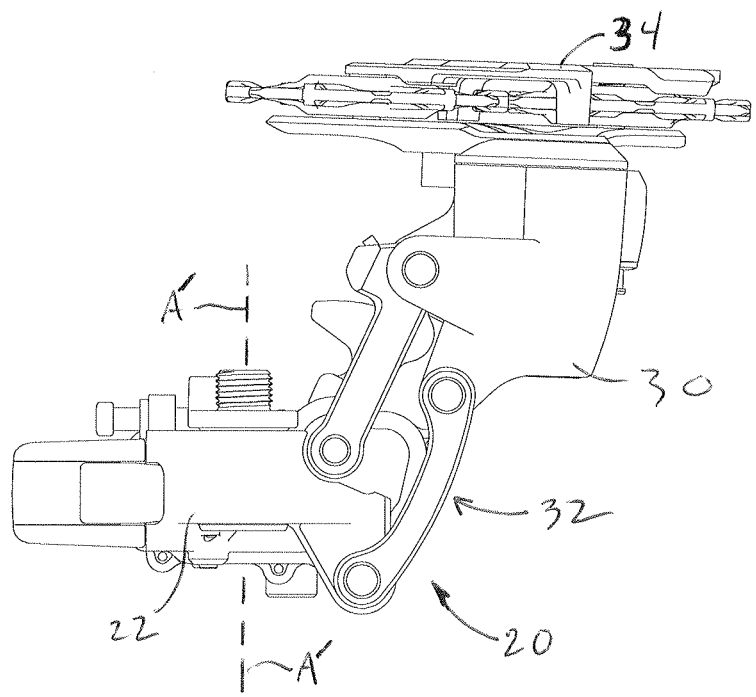

A gearbox 44 that is disposed in and/or forms part or all of the b-knuckle 22 drives the linkage 32 and the cage assembly 34 through the range of motion shown in FIGS. 2a and 2b. The gearbox 44 comprises a transmission 80.

Figure 15A:
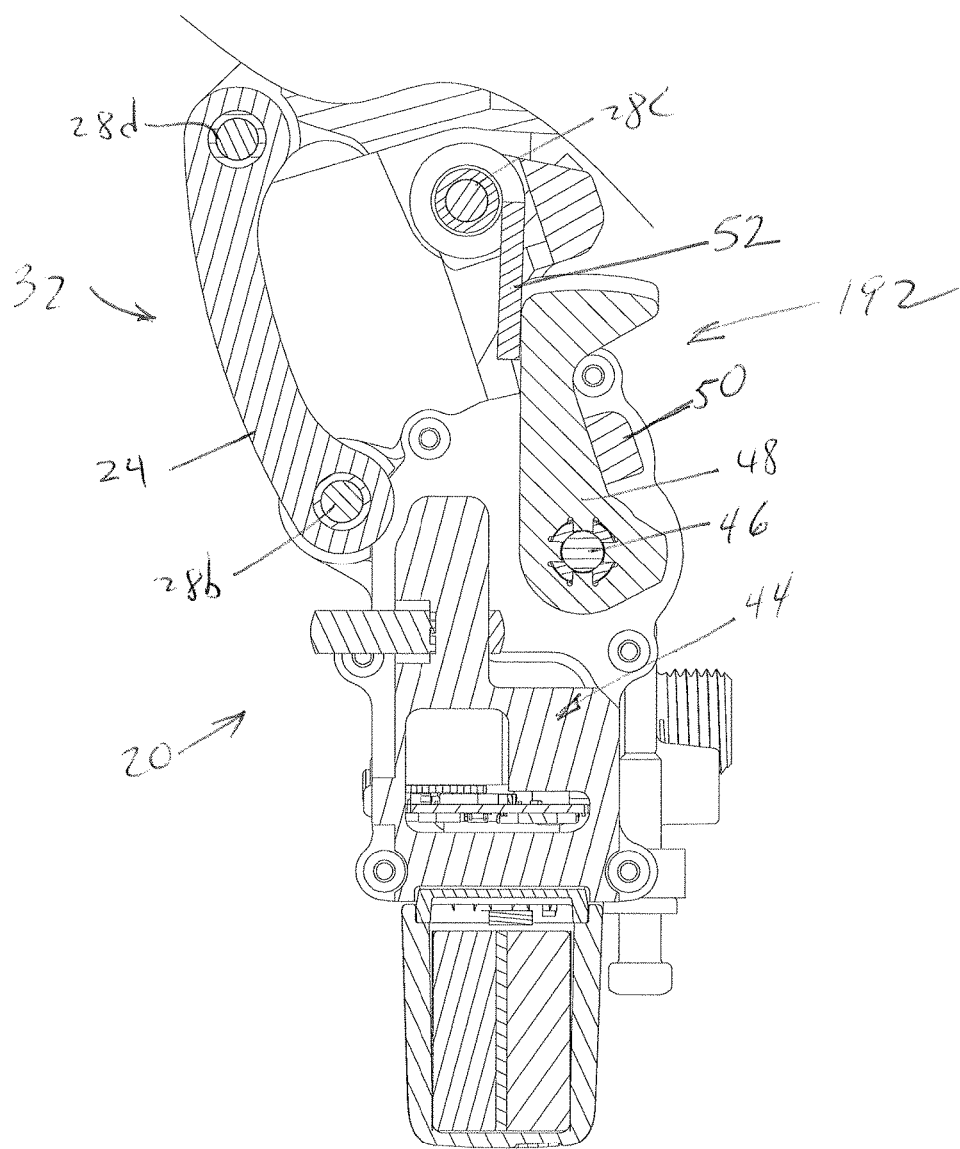
FIG. 15a is a section view of the derailleur assembly through section C-C of FIG. 1a showing the clutch in the non-actuated position.

Referring to FIG. 15a (which is section C-C of FIG. 1a) the gearbox 44 includes an output shaft 46. A drive arm 48 is mounted on the output shaft 46 via a castellated geometry that engages with a corresponding castellated geometry on the drive arm. The drive arm 48 and the output shaft 46 are thereby rotatably fixed to one another.

In order to drive the linkage 32 in the inboard direction, i.e., toward the larger diameter ones of the sprockets 38, the output shaft 46 and the drive arm 48 is rotated by the gearbox 44 clockwise in FIG. 15a, which drives the inner link 26 clockwise via a direct engagement between the drive arm and a projection 50 on the inner link. In order to drive the linkage 32 in the outboard direction, i.e., toward the smaller diameter sprockets 38, the output shaft 46 and the drive arm 48 rotate counterclockwise in FIG. 15a, which drives the inner link 26 counterclockwise via engagement with a preloaded clutch spring 52, the position and function of which will be described later. In other words, the drive arm 48 does not directly push on the inner link 26 to drive it in the outboard direction. Rather, the drive arm 48 pushes on the clutch spring 52, and the clutch spring drives the inner link 26 in the outboard direction. The drive arm 48 and clutch spring 52 are considered a clutch 192, to move the derailleur or decouple the transmission from the derailleur as will be explained in more detail below.

Figure 3:
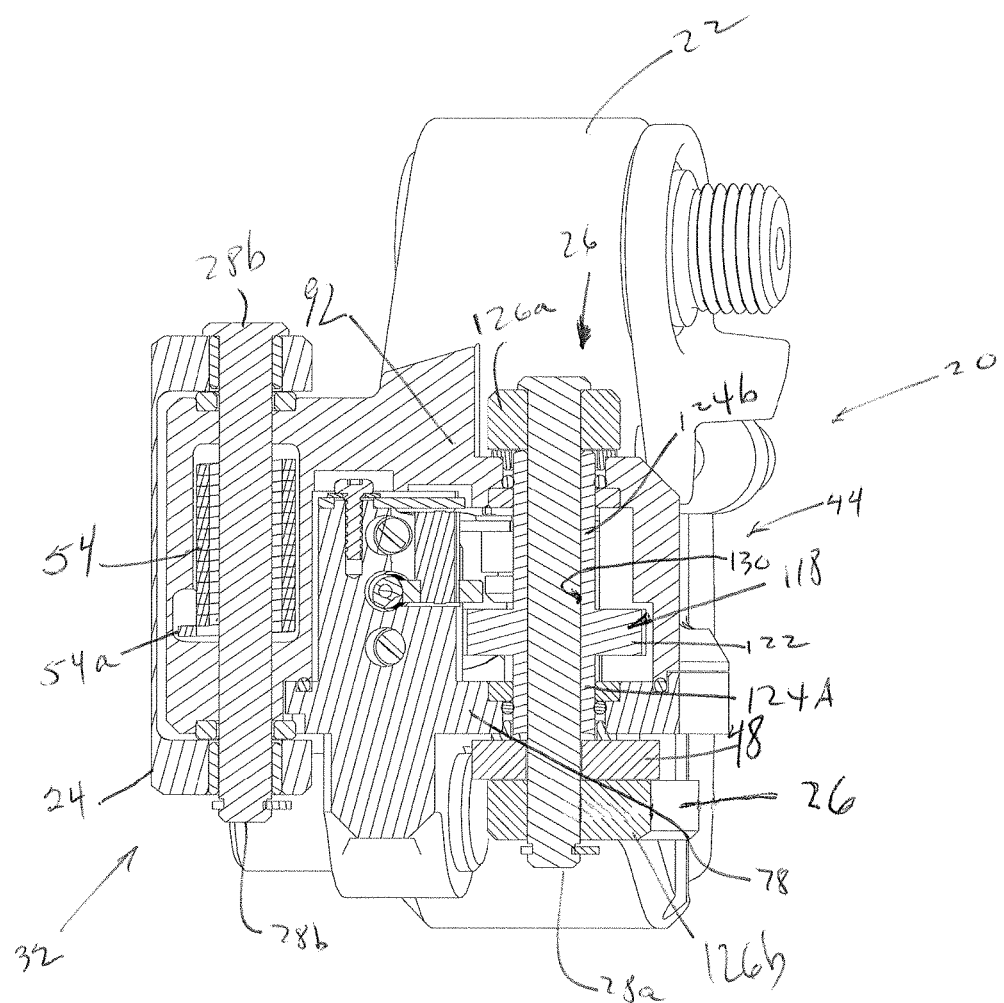

As shown in FIG. 3 (which is section E-E of FIG. 2a), a biasing spring 54 is disposed around one of the linkage pivot pins 28b. One leg 54a of the biasing spring 54 engages the outer link 24, and the other leg (not shown) engages the base member 22. The biasing spring 54 may be an extension spring 54' (FIG. 2a). The action of the biasing spring 54 urges the linkage 32 in the outboard direction to take the backlash out of the gearbox 44 and linkage.

Figure 14:
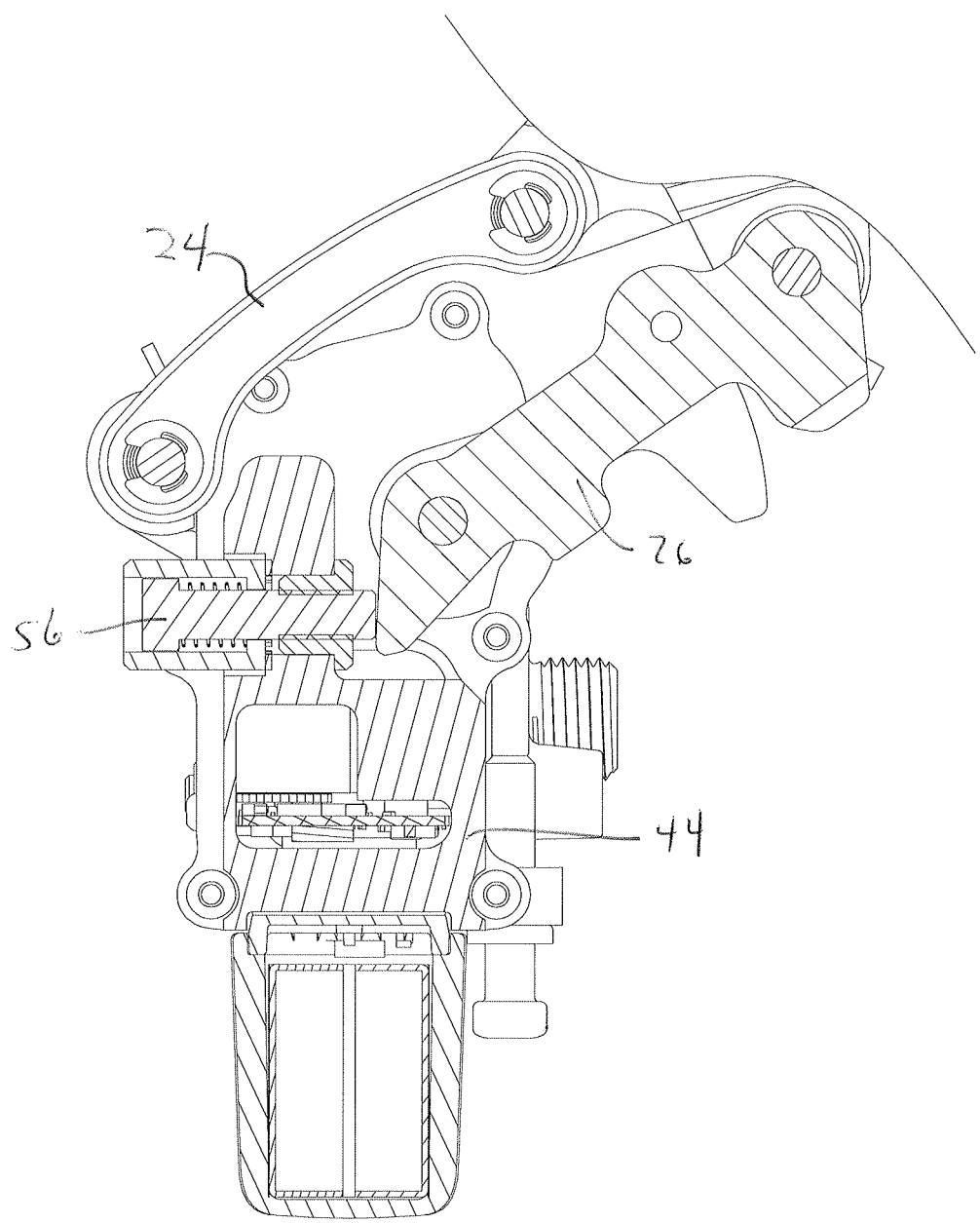
FIG. 14 is a section view of the derailleur assembly through section B-B of FIG. 1a showing the low limit screw.

FIG. 14 (which is section B-B of FIG. 1a) shows the low limit screw 56. The low limit screw 56 is disposed in the gearbox assembly 44, and by advancing and retracting the screw the inboard range of motion of the inner link 26 is limited. The limit screw 56 is adjusted in a tool-free manner, by turning the limit screw 56 by hand. This tool-free design greatly reduces the maximum torque that the limit screw 56 sees since the human hand can exert a at less torque on the screw than a human hand aided by a screwdriver or other tool, and therefore greatly limits the force exerted on the gears (see FIG. 7) of the gearbox 44 by the limit screw. This is desirable because excessive force on the gears could break them.

Figure 7:
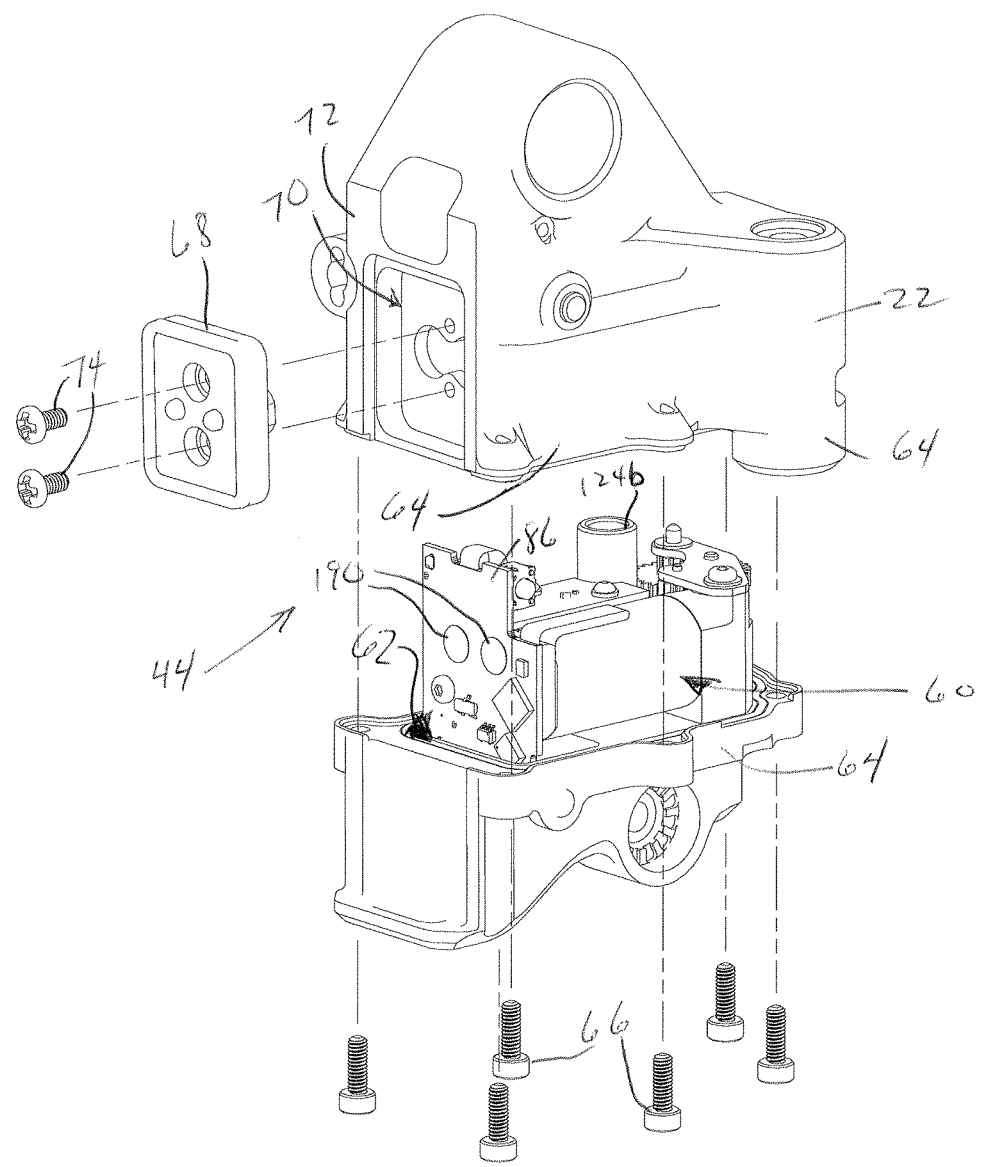
FIG. 7 is an exploded view of a gearbox assembly of the derailleur.

FIG. 7 is an exploded view of the gearbox assembly 44. The gearbox assembly 44 may form the structural part of the b-knuckle 22. As shown in FIG. 7, a motor module 60 (described in detail later) is received in an opening 62 in the bottom of the housing 64 of the gearbox 44 and is secured with fasteners 66, for example, six screws. The housing 64 includes a pogo pin/seal assembly 68 (described in detail below)) received in a recess 70 in the rear wall 72 of the gearbox housing 64 and is secured with fasteners 74, for example, two screws.

Figure 8:
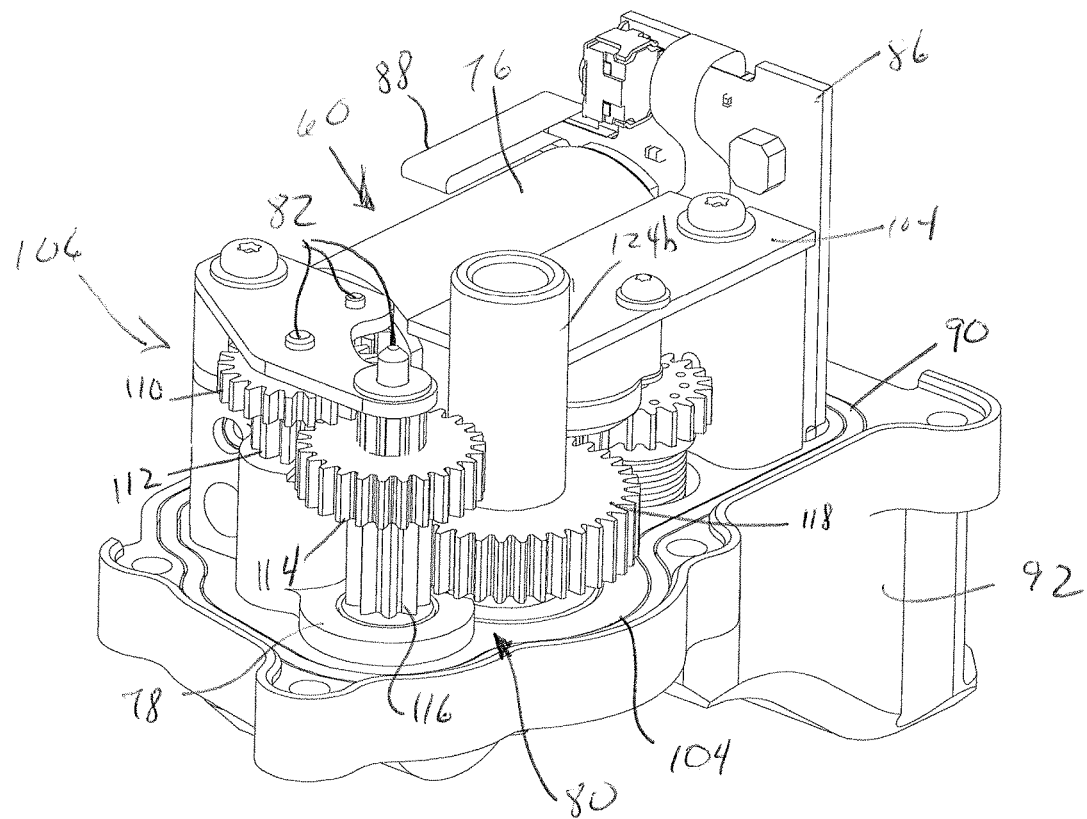
FIG. 8 is a perspective view of a motor module of the derailleur.

An overview of the motor module 60 is shown in FIG. 8. A motor 76 is attached to a motor module base 78, which may be a plastic injection-molded element or elements of any suitable material, and the majority of the transmission 80 is built up on axles 82 that are received in the base 78. A plate 104, which may be stamped metal or any suitable material, is attached to the base 78, by screws for example, and supports the other end of the axles 82 of one or more of the gears, for example three of the gears.

Figure 10:
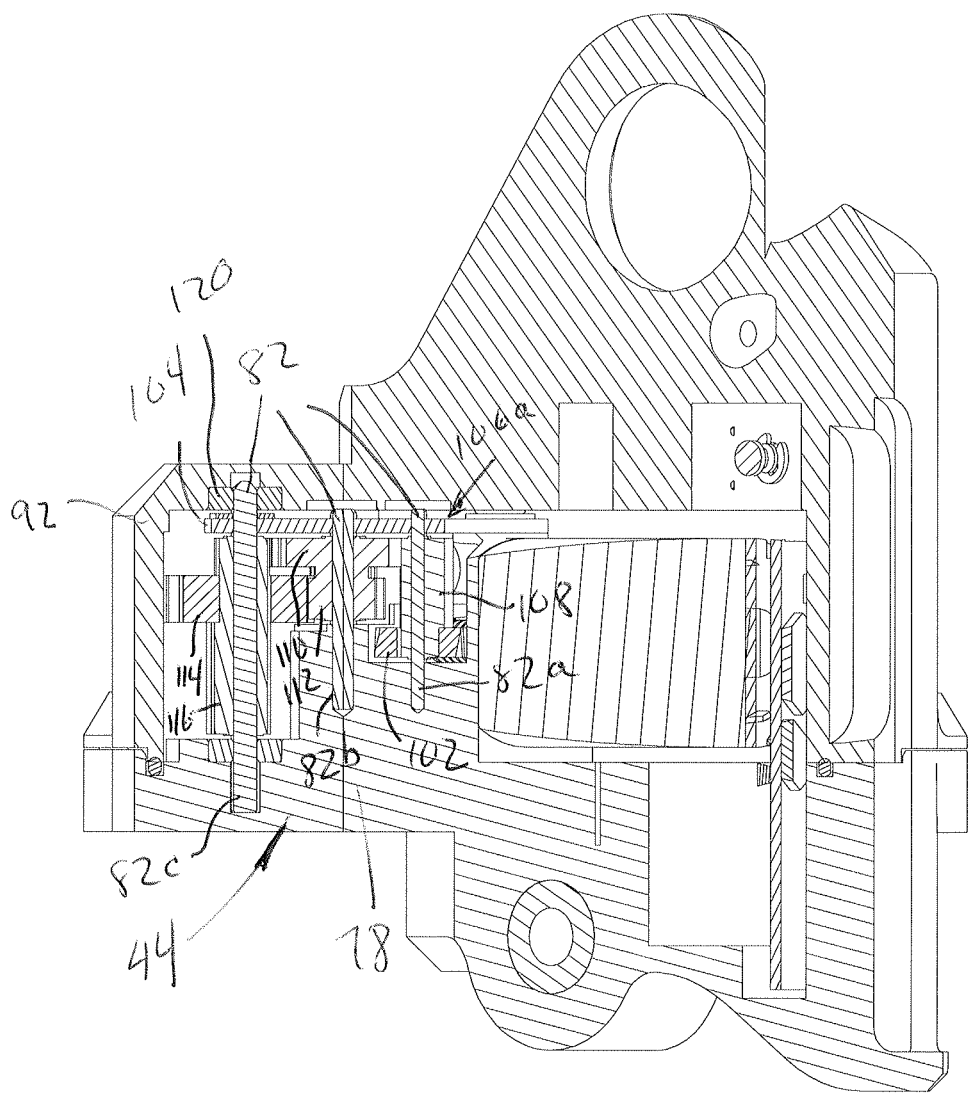
FIG. 10 is a section view of the gearbox assembly through section K-K of FIG. 7a showing three (3) of the gears/axles.
Figure 11:
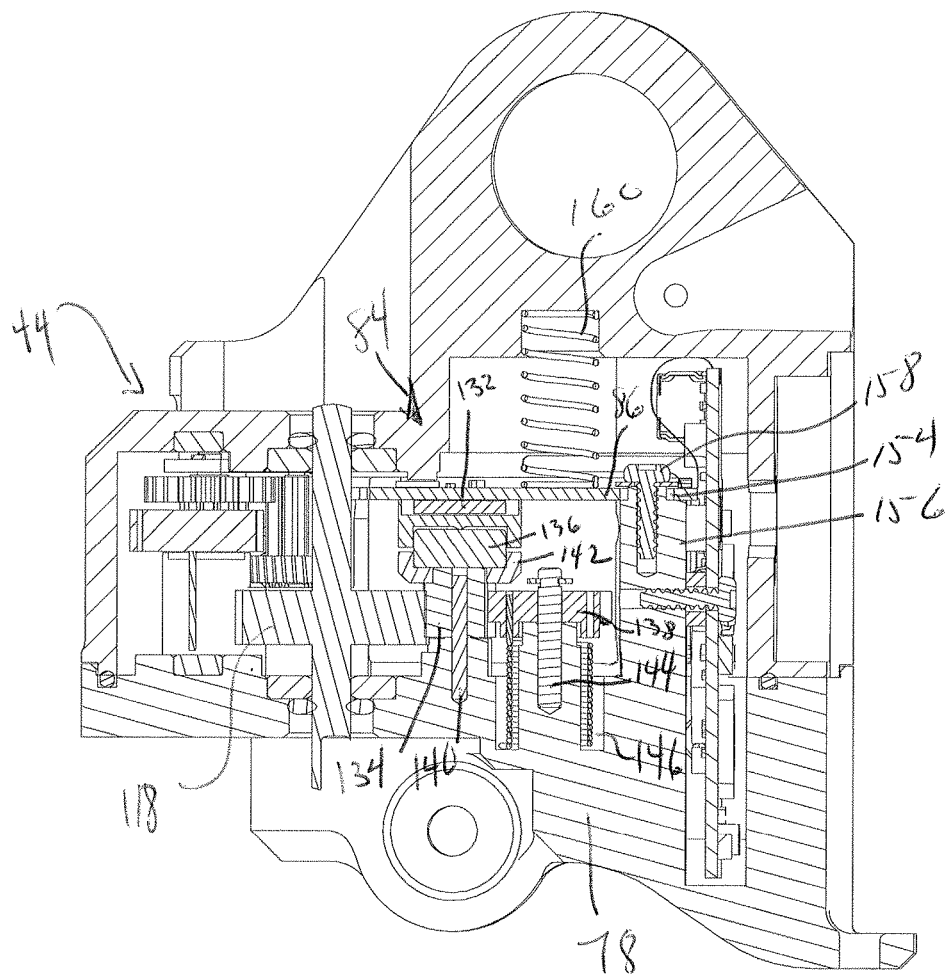
FIG. 11 is a section view of the gearbox assembly through section J-J of FIG. 7a showing the parts relating to the position detector/magnet.

The gearbox 44 includes a position detector 84 (see FIGS. 10, 11). Gears associated with the position detector, which will be described in more detail hereinbelow, are located on or near the motor module base 78. PC boards 86 comprising circuitry for operating various functions of the derailleur 20 are connected together by flexible cables 88. The PC boards 86 may be three rigid boards or any suitable number of boards. Two of the three PC boards 86 may be screwed to the base 78, and the other PC board may be soldered to the back of the motor 76, for example. A flexible seal 90 is provided on the base 78 to seal between the base and a motor module housing 92 after the base is assembled to the motor module housing.

Figure 8A:
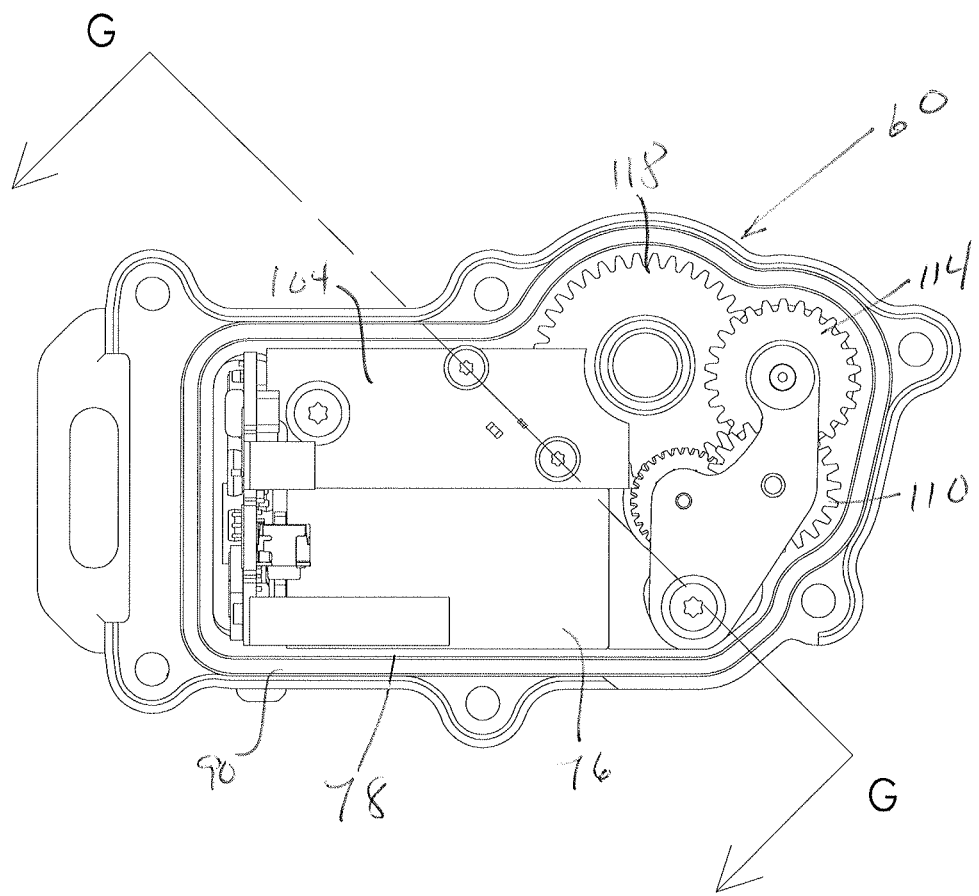
FIG. 8a is a top view of the motor module.
Figure 8B:
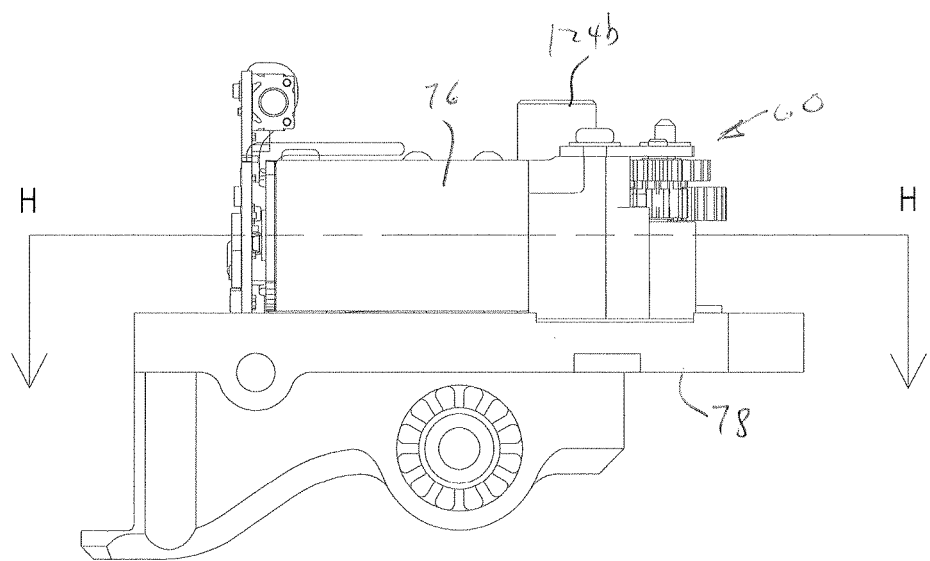
FIG. 8b is a side view of the motor module.
Figure 9:
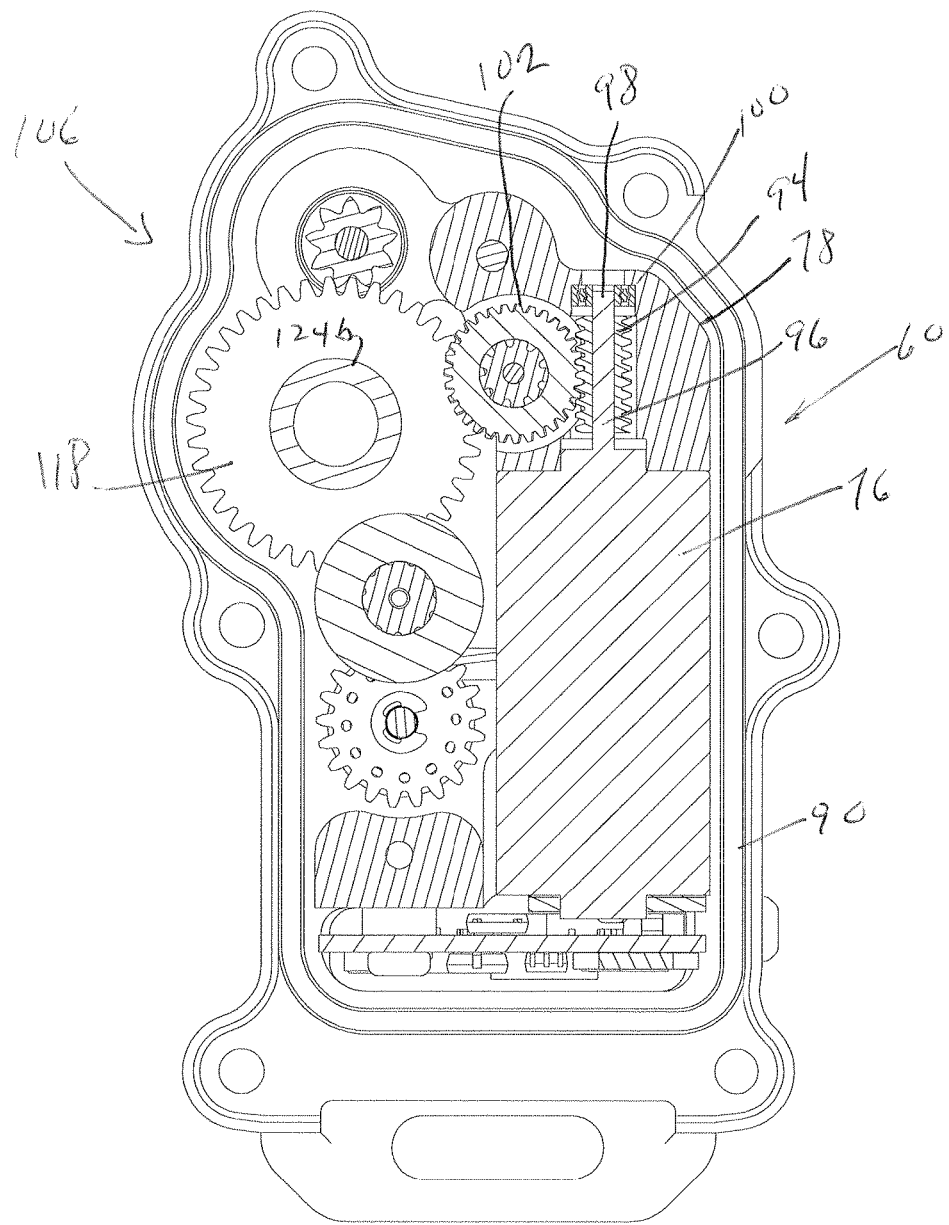
FIG. 9 is a section view of the motor module along section H-H of FIG. 8b showing the motor/worm/worm-gear arrangement.

FIG. 9 is a section view of the motor module 60, showing a cross section of the motor 76 (section H-H of FIG. 8b). Referring to FIG. 9, the motor 76 may be attached to the motor module base 78 with two screws (not visible in this view). A worm 94 is fixed to a shaft 96 of the motor 76, and a distal end 98 of the motor shaft is received in a bearing 100, such as a ball bearing, which is, in turn, received in the motor module base 78. A worm wheel 102 is engaged with the worm 94.

Figure 7A:
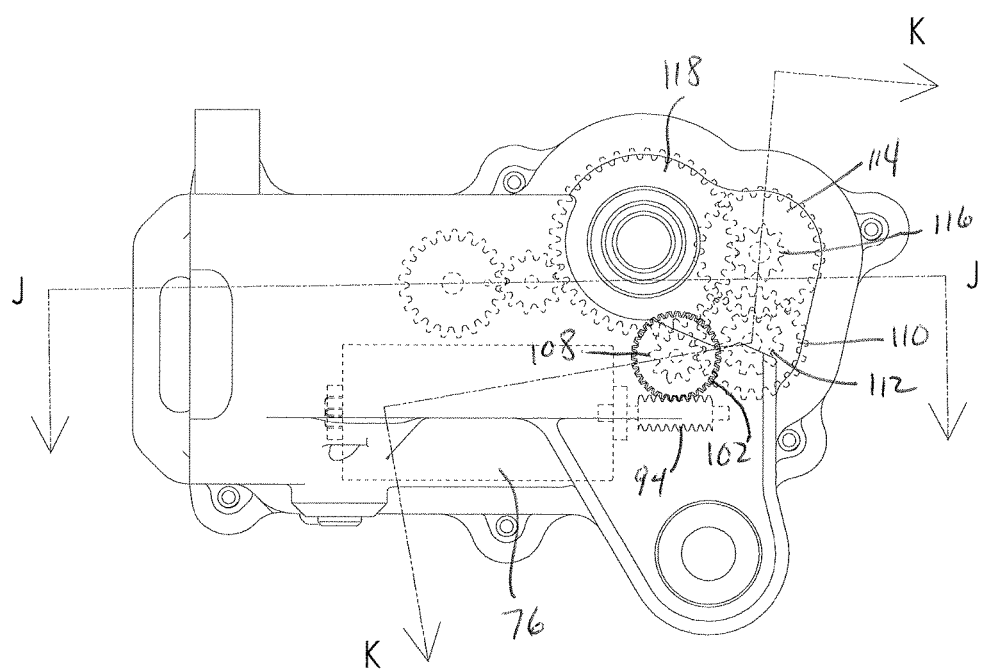
FIG. 7a is a top view of the gearbox assembly.

FIG. 10 is a section view of the gearbox 44, showing three of the gear assemblies (section K-K of FIG. 7a). Referring to FIG. 10, one end of each of the three axles 82 may each be rotatably received in the motor module base 78, and the other end of each axe is received in a corresponding hole in the previously discussed metal plate 104. Three gear assemblies 106a-c of the transmission 80 are rotatably received on the three axles 82, respectively. The gear assembly 106a on the right in FIG. 10 has the worm wheel 102 on the bottom. The worm wheel 102, as discussed earlier, is engaged with the worm 94 on the motor shaft 96 (see FIG. 7a). The worm wheel 102 is rigidly attached to a first pinion gear 108 that is coaxial therewith. The first pinion gear 108 is engaged with a spur gear 110 that is rotatably received on the middle of the three axles 82b. This spur gear 110 is rigidly attached to a second pinion gear 112 that is coaxial therewith. The second pinion gear 112 is engaged with a second spur gear 114 that is rotatably received on the axle 82c shown on the left in FIG. 10. The second spur gear 114 is rigidly attached to a third pinion gear 116 that is coaxial therewith. The third pinion gear 116 is engaged with an output gear 118 (see FIG. 7a) of the gearbox 44 (not visible in this section view). It should also be noted that the axle 82c shown on the left in FIG. 10 has its top end supported in a bearing 120 in the motor module housing 92, which adds a substantial amount of support to the metal plate 104. In other words, the metal plate 104 is supported by the leftmost axle 82c, which in turn is supported by the bearing 120 in the motor module housing 92.

FIG. 3 is a section view of the derailleur 20, showing a cross section of the two linkage pivot pins 28a, b located by the b-knuckle 22 (section EE of FIG. 2a). Referring to the right hand side of FIG. 3, the output gear 118 of the gearbox 44 has a toothed portion 122 and two tubular portions 124a, b projecting from either side of the toothed portion. The lower tubular portion 124a is rotatably received in a bearing in the motor module base 78, and the upper tubular portion 124b is rotatably received in a bearing in the motor module housing 92. The end of the lower tubular portion 124a has the aforementioned castellated geometry that engages the drive arm 48 as previously described (see FIG. 15a). The inner link 26 has two arms 126a, b, one of which is located above the upper tubular portion 124b of the output gear 118, and the other of which is located below the lower tubular portion 124a of the output gear. A hole 128 in the inner link arms 126a, b is coaxial with a hole 130 in the output gear 118, and the associated link pin 28a is received in these holes. The link pin 28a is rotatable relative to the output gear 118, but is preferably rotatably fixed to the inner link 26.

FIG. 11 is a section view of the gearbox 44, showing a cross section of the position detector 84. The position detector 84 is used to determine the position of the derailleur by sensing rotation of the transmission 80 (see FIG. 8). The position detector 84 includes a sensor in the form of a position detector chip 132, a position detector gear 134, a position detector magnet 136, and an optional position detector gear biasing gear 138 (section J-J of FIG. 7a). Referring to FIG. 11, the position detector gear 134 is rotatably mounted on a position detector axle 140, which is supported by the motor module base 78. The position detector gear 134 engages the output gear 118. A magnet holder 142 is fixed to the position detector gear 134, and the position detector magnet 136 is fixed to the magnet holder. Thus, the position detector gear 134, magnet holder 142, and magnet 136 all rotate together as a unit.

A position detector gear biasing gear axle 144 is supported by the motor module base 78. The position detector gear biasing gear 138 is rotatably received on the position detector gear biasing gear axle 144. One leg of a torsion spring 146 is engaged with the motor module base 78, and the other leg of the torsion spring is engaged with the position detector gear biasing gear 138. Thus, the torsion spring 146 exerts a torque on the position detector gear biasing gear 138, which in turn exerts a torque on the position detector gear 134 to effectively eliminate any play or backlash between the position detector gear and the output gear 118.

Figure 12:
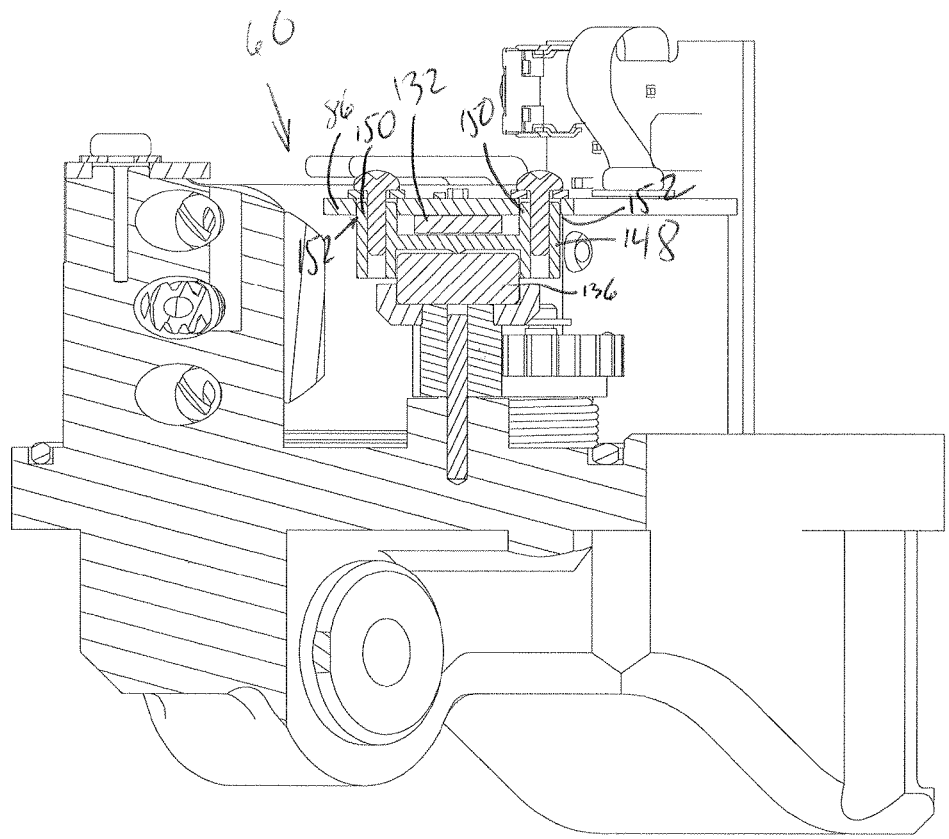
FIG. 12 is a section view of the motor module through section G-G of FIG. 8a showing an element for locating the position detector chip relative to the position detector magnet.

FIG. 12 is a section view of the motor module 60, showing a cross section of the means by which the position detector chip 132 is accurately located relative to the position detector magnet 136 (section G-G of FIG. 8a). Referring to FIG. 12, a position detector chip 132 is disposed on one of the three PC boards 86. A magnet guide 148 has two projections 150, which may be cylindrical, and which fit into two corresponding holes 152 in the PC board 86. Two fasteners, e.g., screws, are inserted into the projections 150 to fasten the magnet guide 148 in place on the PC board 86. Thus, the PC board 86, position detector chip 132, magnet guide 148, and two screws form a subassembly. During assembly of the motor module 60, this subassembly is assembled to the motor module such that the magnet 136 is received in the magnet guide 148. Thus, the axis of the position detector chip 132 is accurately aligned to the axis of the position detector magnet 136.

In order to prevent rotation of the PC board 86 relative to the motor module 60, a slot 154 in the other end of the PC board engages a boss 156 on the motor module base 78 (see FIG. 11). Again referring to FIG. 11, a screw 158 is then screwed into a hole in the boss 156 until the screw bottoms out on the boss. In this manner, the alignment between the position detector chip 132 and the position detector magnet 136 is held very accurately. An optional compression spring 160 biases the PC board assembly 86 downwards in FIG. 11. Alternatively, the magnet guide 148 could have geometry that locates directly on the position detector chip 132, rather than locating in two holes 152 in the PC board 86.

Figure 13:
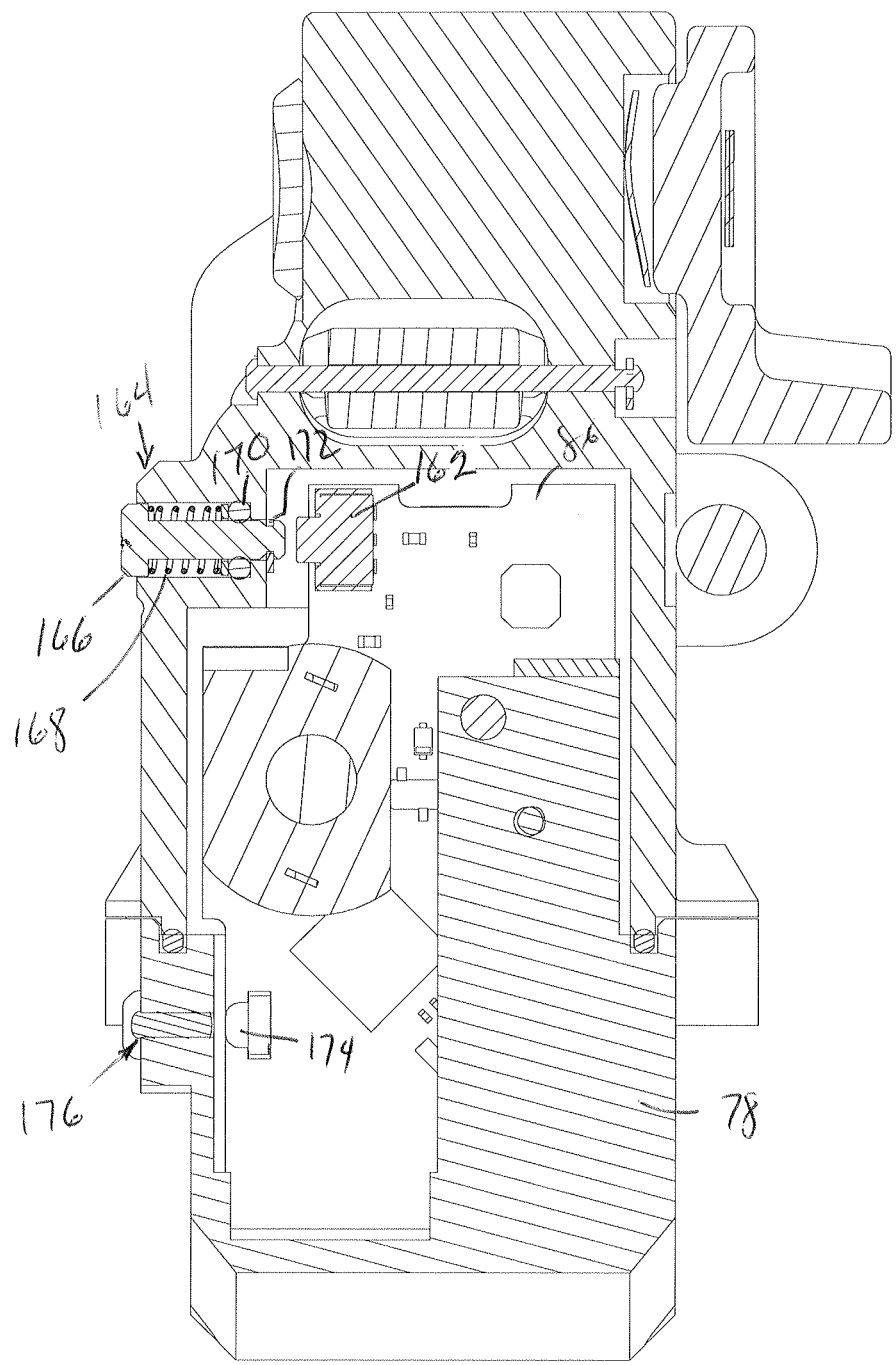
FIG. 13 is a section view of the gearbox assembly through section A-A of FIG. 1a showing a button and its actuator assembly and, in addition, a LED and lens.

FIG. 13 is a section view of the gearbox 44, showing a cross section of a button 162 and its actuator assembly 164 (section A-A of FIG. 1a). The button 162 may be an electrical component on the PC board 86. The actuator assembly 164 includes a plunger 166, return spring 168, O-ring seal 170, and retaining clip 172. When the plunger 166 is pressed by the user, it actuates the button 162. Also visible towards the bottom of FIG. 13 is an LED 174, which is another component on the PC board 86. This LED 174 shines through a clear lens 176 (also partially visible in FIG. 13) in the motor module base 78.

Figure 5A:
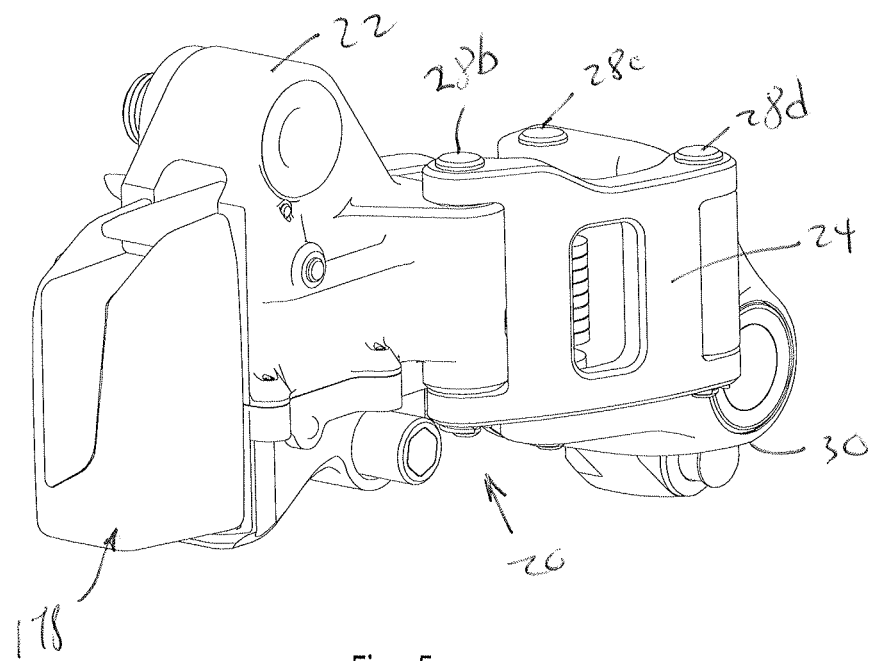
FIGS. 5a, b are perspective views of the derailleur with the power source installed (5a) and removed (5b), respectively. The cage is not shown for clarity.
Figure 5B:
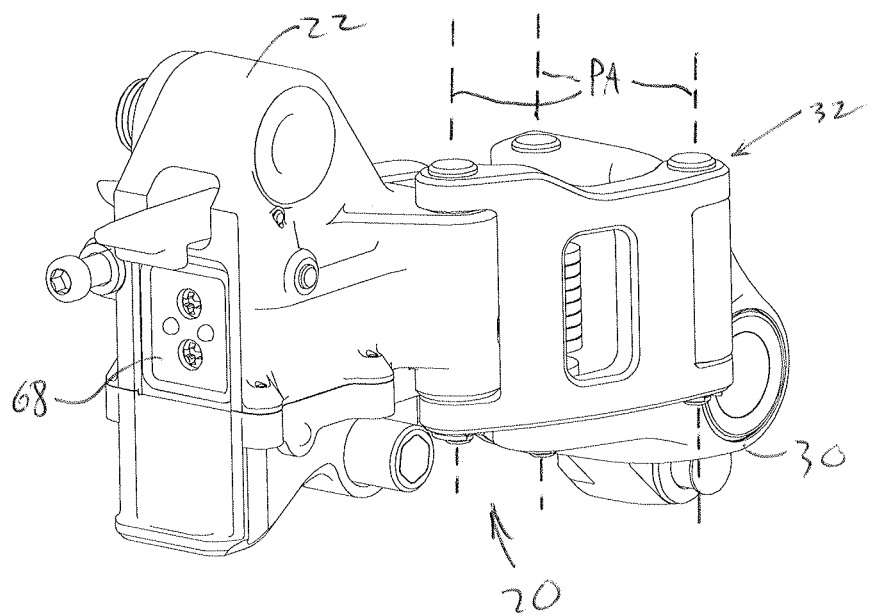

FIGS. 5a and 5b show the derailleur 20 with a power source 178, which may be a battery, installed (FIG. 5a) and with the power source removed (FIG. 5b). The cage assembly is omitted in these views for clarity. The battery may be a rechargeable battery and may be of the lithium-polymer variety.

Figure 6A:
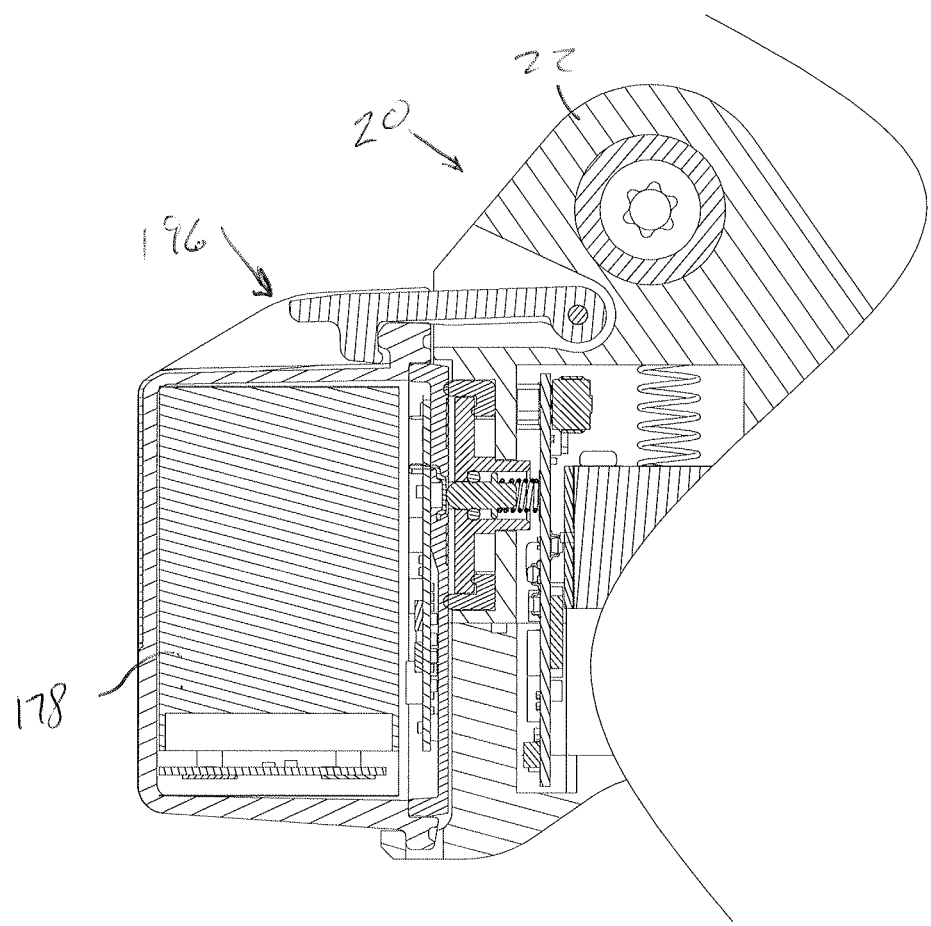
Figure 6B:
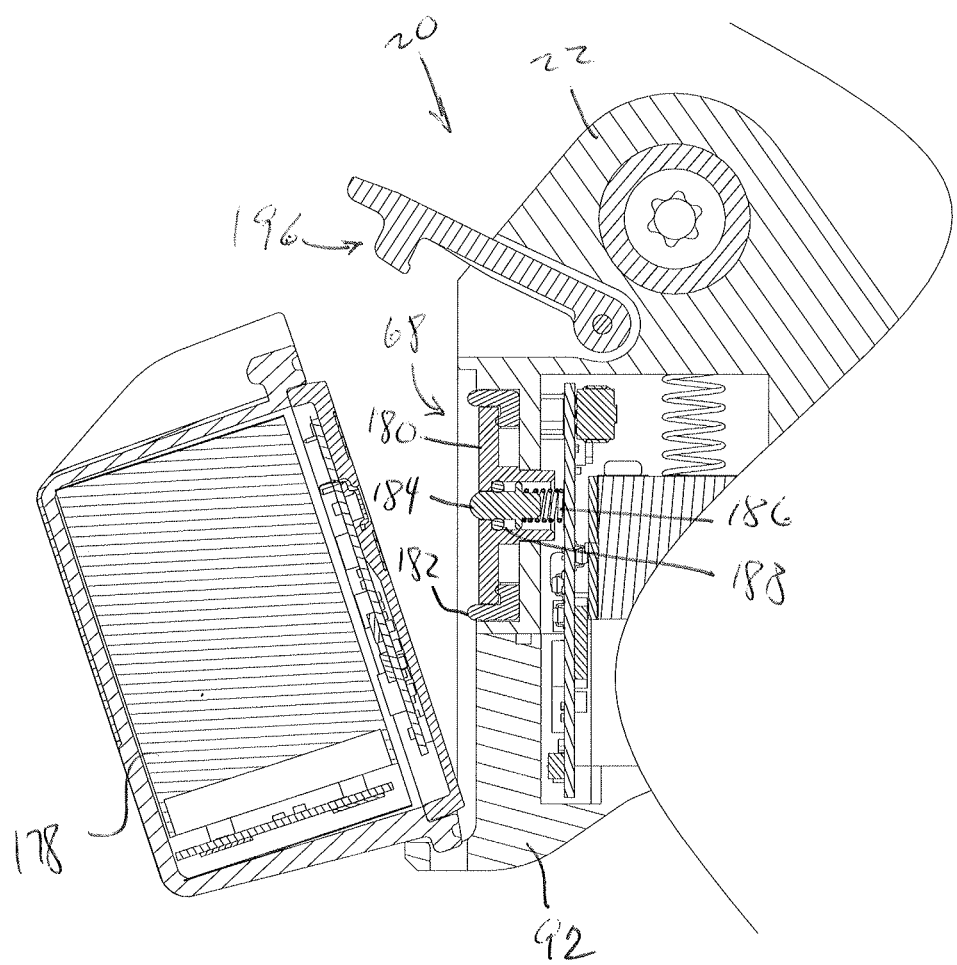
Figure 6C:
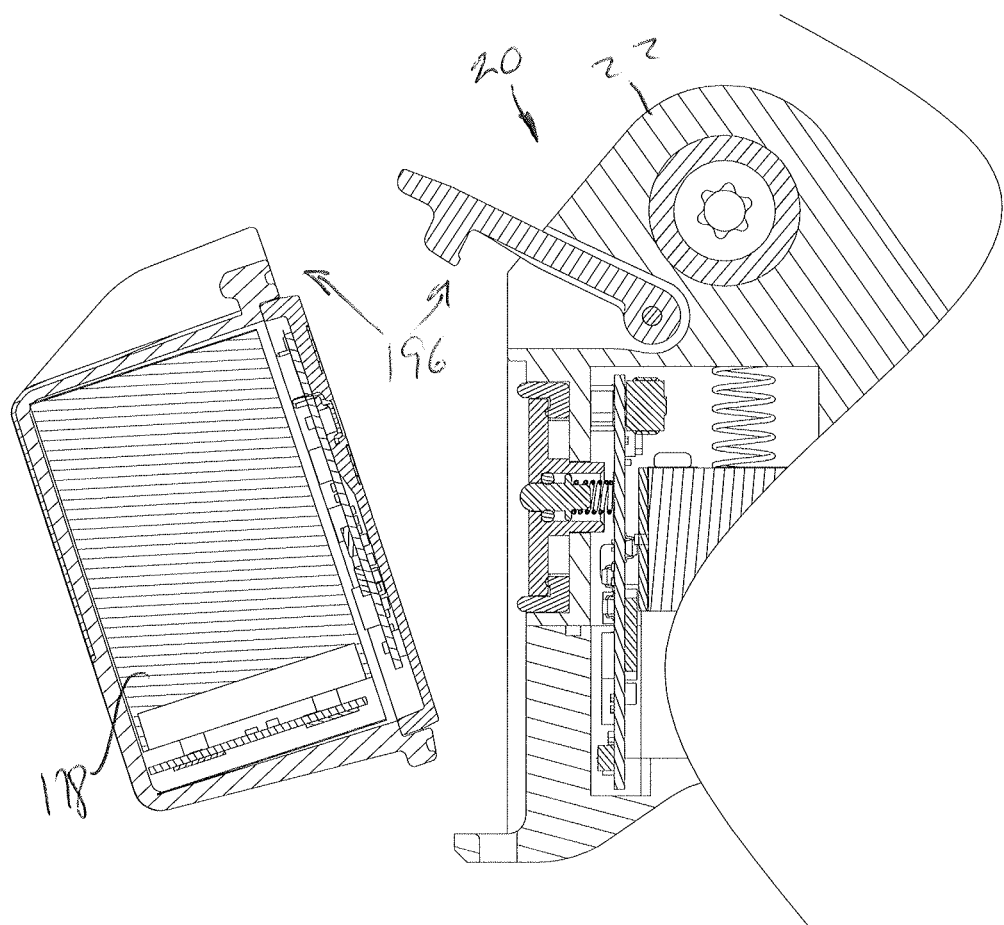

FIGS. 6a, b, c (section D-D of FIG. 2a) show the electrical and mechanical connectivity between the battery 178 and the derailleur 20, and also show the procedure for removing the battery from the derailleur. Referring to FIGS. 6a, b, c, and FIG. 7, the pogo pin assembly 68 includes a pogo pin base 180, a pogo pin base seal member 182, and two pogo pins 184 (only one visible), two return springs 186 (one visible), and two O-rings 188 (one visible). The pogo pin assembly 68 may be attached to the motor module housing 92 with two screws as shown in FIG. 7. Referring to FIGS. 6a, b, c, one end of the return springs 186 contacts the pogo pin 184, and the other end of the return springs contacts electrical contact pads 190 (FIG. 7) on a PC board 86. Thus, when the battery 178 is installed as shown in FIG. 6a, electricity can flow from the battery, through the pogo pin 184, through the return spring 186, and into the PC board 86. The power supply 178 may be mechanically retained on the derailleur 20 with a catch 196.

Figure 4:
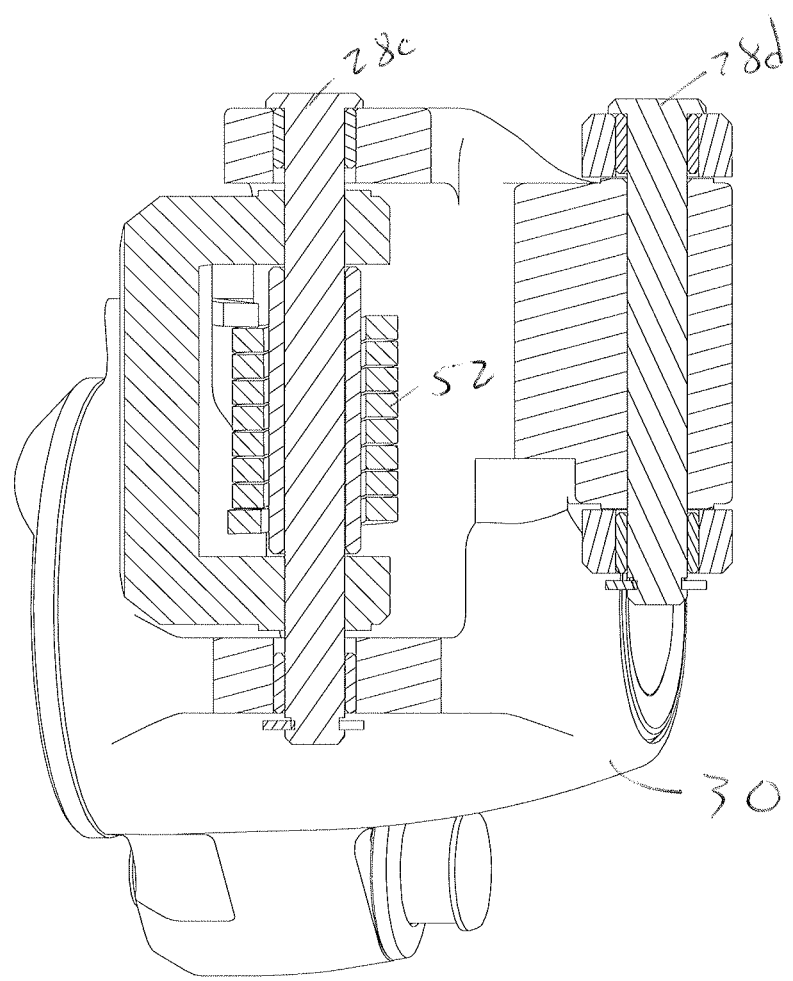
Figure 15B:
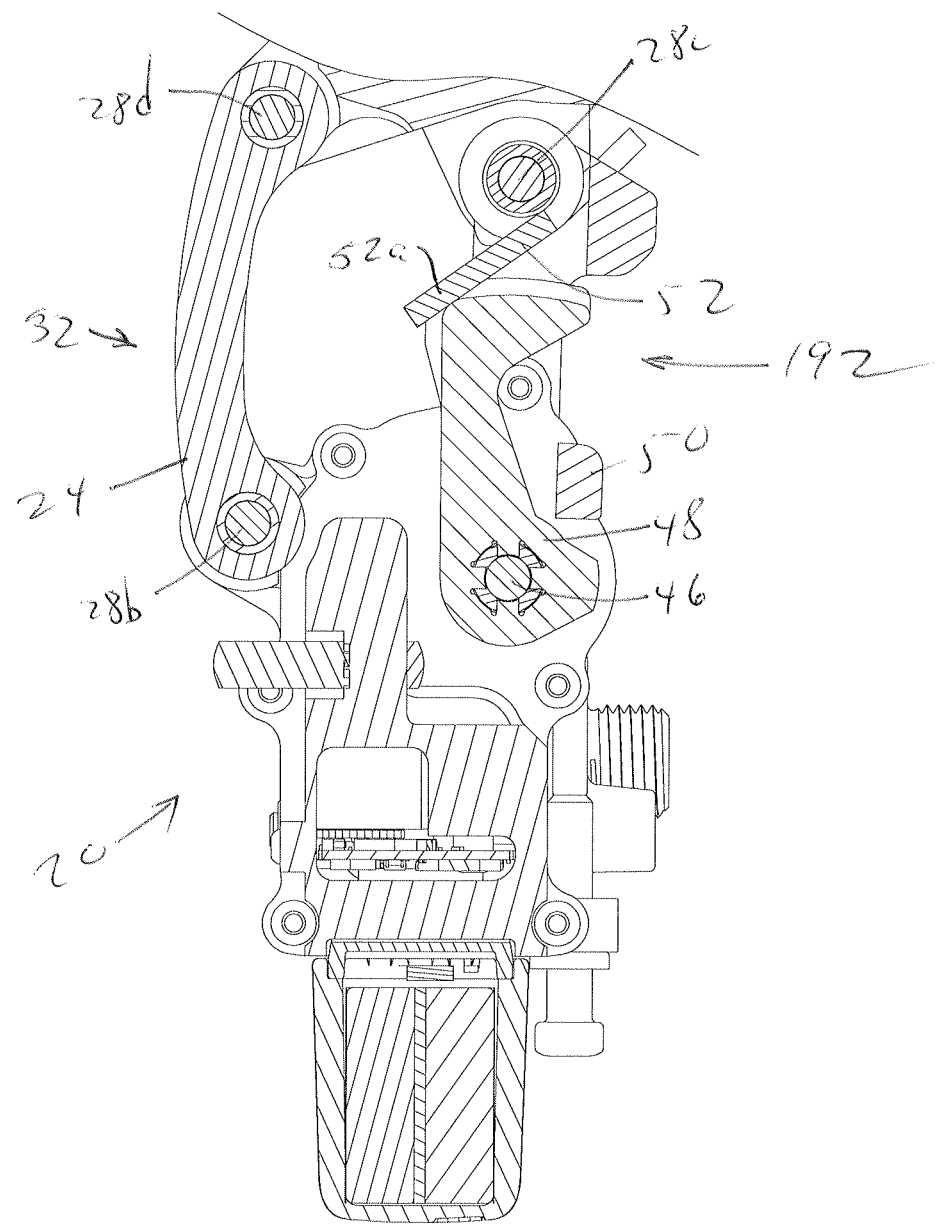
FIG. 15b is a section view of the derailleur assembly through section C-C of FIG. 1a showing the clutch in a partially actuated position.
Figure 15C:
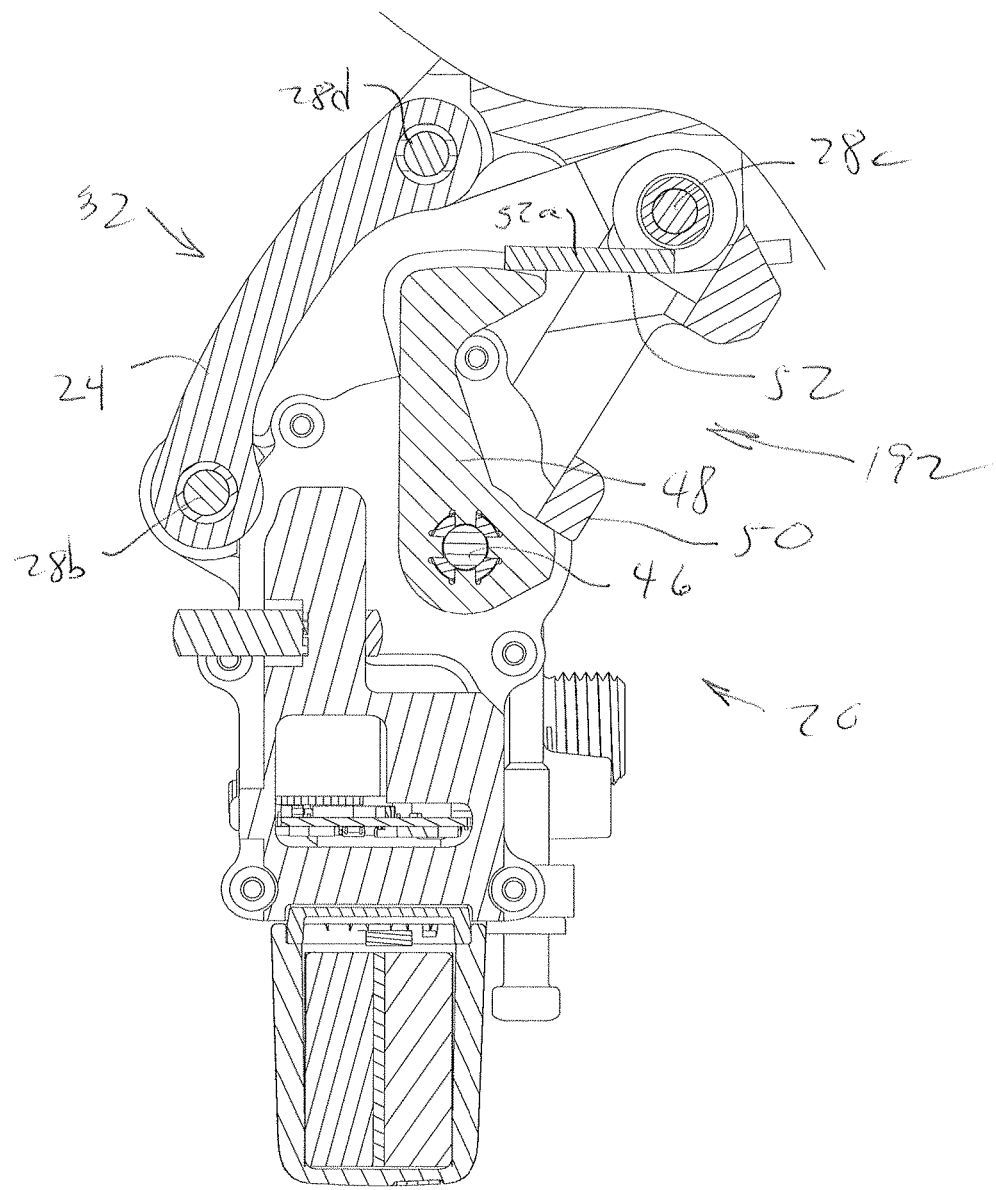
FIG. 15c is a section view of the derailleur assembly through section C-C of FIG. 1a showing the clutch in its fully actuated position, with further movement prevented by a hard stop between the drive arm and the inner link.

Turning to FIGS. 15a-c, and also FIG. 4, the derailleur 20 is equipped with a breakaway mechanism or clutch 192 that protects the gears 106 of the transmission 80 in the gearbox 44 (FIG. 8) in the event of a crash or other side impact to the derailleur. FIGS. 15a, b and c, show a section view of the derailleur 20 (section C-C of FIG. 1a) with the clutch 192 in its non-actuated (i.e. normal) position (FIG. 15a), its partially actuated position (FIG. 15b), and its fully actuated position (FIG. 15c). During normal riding, the elements of the clutch 192 are arranged as shown in FIG. 15a, comprising the spring 52 and drive arm 48.

In the event of a crash or other side impact (a force directed from left to right in FIGS. 15a, b and c), if the force of the impact overcomes the preload in the torsion-type clutch spring 52, the links of the linkage 32 rotate clockwise about their pivot pins 28, deflecting the leg 52a of the spring as shown in FIG. 15b. Thus, the linkage 32 is able to move without imparting any movement to the gears 106 in the gearbox 44. When the impact force is removed from the derailleur 20, the spring leg 52a will push against the drive arm 48 and cause the derailleur to go back to its normal state shown in FIG. 15a.

In the event of a more forceful crash or side impact, the links of linkage 32 can rotate clockwise about their pivot pins 28 all the way to the position shown in FIG. 15c. In this position, further clockwise rotation of the links 32 is prevented when the drive arm 48 and projection 50 interact and any additional force imparted to the links will be transferred to the gears 106.

Another aspect of the invention that protects the gears 106 is the straight-P arrangement of the derailleur 20. When a bicycle is moving over rough terrain, the p-knuckle 30 of the derailleur 20 experiences forces in the vertical direction. In a slant P derailleur, the axes of the link pins are angled relative to the vertical direction, and these forces can be transmitted through the linkage/parallelogram, imparting undesired forces to the gears in the transmission, since the linkage is able to move in a direction that has a substantial vertical component. The motion of the linkage 32 of the present invention, however, is substantially lateral, rather than vertical, at least because of the vertical orientation of the link pins 28, and therefore the elements of the derailleur are relatively isolated from the vertical forces created when the bicycle is moving over rough terrain, thereby protecting the gears 106 of the transmission 80 from damage. Preferably, the axes of the link pins 28 are all within 30 degrees of vertical (in addition to being normal to the axial A' direction).

A radio chip 194 is positioned on the PC board 86 in such a way to maximize radio signals transmitted between the derailleur 20 and a shifter (or other control devices). Referring to FIG. 11, the radio chip 194 is positioned on the lower portion of the rightmost PC board 86 such that it is substantially housed in the motor module base 78, which may be made of plastic, or any suitable material that does not interfere with the transmission of radio signals. In other words, the radio chip 194 is preferably not positioned on the upper portion of the PC board 86, because the upper portion of the PC board is substantially housed in the motor module housing 92, which is preferably made of aluminum, which is a material that is not conducive to transmitting radio signals.

While this invention has been described by reference to a particular embodiment, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. An electromechanical rear derailleur for a bicycle, comprising:
    a base member attachable to the bicycle along a mounting axis;
    a movable member having a cage assembly attached thereto;
    a linkage including pivot axes oriented substantially perpendicular to the mounting axis, the linkage coupling the movable member to the base member and operative to enable movement of the movable member relative to the base member;
    a power source disposed on the rear derailleur rearward of the pivot axes;
    a motor electrically connected to the power source; and
    a transmission coupled to and actuated by the motor to move the movable member.

2. The rear derailleur of claim 1, wherein the power source is disposed on or in the base member.

3. The rear derailleur of claim 1, wherein the linkage includes an outer link member and an inner link member.

4. The rear derailleur of claim 1, wherein the linkage includes link pins on which the linkage pivots, the link pins defining the pivot axes.

5. The rear derailleur of claim 4, wherein the transmission includes a plurality of gears rotatable about a plurality of gear axes, respectively, wherein the gear axes are substantially parallel to the pivot axes.

6. The rear derailleur of claim 5, wherein the transmission is disposed on or in the base member.

7. The rear derailleur of claim 6, wherein the motor is disposed on or in the base member.

8. The rear derailleur of claim 7, wherein the power source is disposed on or in the base member.

9. The rear derailleur of claim 7, wherein the linkage includes an outer link member and an inner link member.

10. The rear derailleur of claim 4, further comprising a clutch between the movable member and the transmission, the clutch moving the movable member responsive to operation of the transmission.

11. The rear derailleur of claim 10, the clutch including a drive arm coupled to the transmission and a clutch spring in contact with the drive arm.

12. The rear derailleur of claim 11, wherein the transmission includes an output gear and the drive arm is coupled to the output gear.

13. The rear derailleur of claim 12, wherein the clutch spring is disposed on an inner link member of the linkage.

14. The rear derailleur of claim 12, wherein the clutch spring is disposed about the link pin that attaches an inner link member of the linkage to the movable member.

15. The rear derailleur of claim 4, wherein the motor has a motor shaft with a motor shaft axis that is perpendicular to the pivot axes.

16. The rear derailleur of claim 1, wherein the linkage includes link pins on which the linkage pivots, the link pins defining the pivot axes and the transmission includes a plurality of gears rotatable about a plurality of gear axles, respectively, wherein at least some of the gear axles have gear axle axes that are substantially parallel to the pivot axes.

17. The rear derailleur of claim 1, wherein the pivot axes are non-vertical.

18. An electromechanical rear derailleur for a bicycle, comprising:
   a base member attachable to the bicycle;
   a movable member having a cage assembly attached thereto;
   a linkage coupling the movable member to the base member and operative to enable movement of the movable member relative to the base member;
   a power source;
   a motor electrically connected to the power source;
   a transmission coupled to and actuated by operation of the motor to move the movable member;
   a position detector, comprising:
      a magnet;
      a sensor to sense relative rotation between the magnet and the sensor;
      a magnet guide sized and shaped to guidingly receive a portion of the magnet and position the sensor and magnet within an effective range of each other; and
      a magnet holder disposed in the rear derailleur and coupled to the transmission, the magnet held by the magnet holder; and
   a PC board positioned in the base member and wherein the sensor is disposed on the PC board in position to sense motion of the magnet.

19. The rear derailleur of claim 18, wherein the magnet is rotated by the transmission.

20. The rear derailleur of claim 18, wherein the magnet guide is disposed on the PC board and the magnet extends from the magnet holder.

21. The rear derailleur of claim 20, wherein the magnet holder is attached to a position detector gear.

22. The rear derailleur of claim 21, wherein the position detector gear is contact with and actuated by an output gear of the transmission.

23. The rear derailleur of claim 22, further comprising a position detector gear biasing gear disposed in the derailleur and coupled to the position detector gear to reduce backlash thereof.

24. The rear derailleur of claim 1, wherein the cage assembly comprises at least one wheel configured to engage with a chain.

25. The rear derailleur of claim 1, wherein the power source is a battery configured for removable attachment to the base member.

* * * * *